(12) United States Patent
Goggin et al.

(10) Patent No.: US 10,228,068 B2
(45) Date of Patent: Mar. 12, 2019

(54) FRUSTUM-SHAPED RUPTURE DISK HAVING LINE OF WEAKNESS

(71) Applicant: BS&B Innovation Limited, Limerick (IE)

(72) Inventors: Paul Goggin, County Tipperary (IE); Geoffrey Brazier, Woodbury, MN (US)

(73) Assignee: BS&B Innovations Limited, Limerick (IE)

( * ) Notice: Subject to any disclaimer, the term of this patent is extended or adjusted under 35 U.S.C. 154(b) by 81 days.

(21) Appl. No.: 14/786,392

(22) PCT Filed: Apr. 25, 2014

(86) PCT No.: PCT/US2014/035510
§ 371 (c)(1),
(2) Date: Oct. 22, 2015

(87) PCT Pub. No.: WO2014/176533
PCT Pub. Date: Oct. 30, 2014

(65) Prior Publication Data
US 2016/0146363 A1    May 26, 2016

Related U.S. Application Data

(60) Provisional application No. 61/854,491, filed on Apr. 25, 2013.

(51) Int. Cl.
*F16K 17/14* (2006.01)
*F16K 17/16* (2006.01)

(52) U.S. Cl.
CPC ............ *F16K 17/16* (2013.01); *F16K 17/162* (2013.01)

(58) Field of Classification Search
CPC ................................ F16K 17/16; F16K 17/162
(Continued)

(56) References Cited

U.S. PATENT DOCUMENTS

D198,290 S  *  5/1964  Miller et al. ................... D9/425
3,439,824 A  *  4/1969  Sparks ...................... A61J 9/00
                                                          215/11.6
(Continued)

FOREIGN PATENT DOCUMENTS

EP       1835211 A1     9/2007
WO    2002051711 A1     7/2002
WO    2008140702 A2    11/2008

OTHER PUBLICATIONS

PCT International Search Report for International Application No. PCT/US2014/035510, dated Jul. 20, 2014 (5 pages).
(Continued)

*Primary Examiner* — Minh Le
(74) *Attorney, Agent, or Firm* — Finnegan, Henderson, Farabow, Garrett & Dunner, LLP

(57) ABSTRACT

A rupture disk (200) having a line of weakness (235) is disclosed. In one embodiment, a frustum-shaped rupture disk has a shear-scored line of weakness located in one or more of a central truncated portion (220), an angled frustum portion (230), a flange portion (210), and in the areas of transition between a flange portion and an angled frustum portion, and between an angled frustum portion and a central truncated portion. In another embodiment, a frustum-shaped rupture disk has an angled frustum portion, with a line of weakness in the angled frustum portion. A stiffening member may be provided to stiffen a central truncated portion of a frustum-shaped rupture disk.

26 Claims, 26 Drawing Sheets

(58) Field of Classification Search
USPC ......... 137/68.27, 68.18, 68.19, 68.23, 68.25, 137/68.26, 68.28
See application file for complete search history.

(56) References Cited

U.S. PATENT DOCUMENTS

| | | | | |
|---|---|---|---|---|
| 3,635,234 | A * | 1/1972 | Dawson | F16K 13/04 137/68.21 |
| 4,043,481 | A * | 8/1977 | Herbst | B21D 51/383 220/266 |
| 4,109,500 | A * | 8/1978 | Franek | B21B 1/0815 225/2 |
| 4,282,996 | A * | 8/1981 | Maeda | B23D 19/06 225/2 |
| 4,416,388 | A * | 11/1983 | Mulawski | B65D 83/70 137/68.11 |
| 4,436,218 | A * | 3/1984 | Beese | F16K 17/16 137/68.26 |
| 4,513,874 | A * | 4/1985 | Mulawski | B65D 83/70 137/68.25 |
| 4,576,303 | A * | 3/1986 | Mundt | B65D 83/70 137/68.23 |
| 4,580,690 | A * | 4/1986 | Mulawski | B65D 83/70 137/68.26 |
| 4,759,460 | A * | 7/1988 | Mozley | F16K 17/1606 137/68.26 |
| 5,154,202 | A * | 10/1992 | Hibler, Jr. | F16K 17/162 137/565.35 |
| 5,267,666 | A * | 12/1993 | Hinrichs | F16K 17/162 137/68.21 |
| 5,467,886 | A * | 11/1995 | Hinrichs | F16K 17/1606 137/68.26 |
| 5,570,803 | A | 11/1996 | Farwell | |
| 5,678,307 | A | 10/1997 | Farwell | |
| 5,934,308 | A | 8/1999 | Farwell | |
| 5,974,851 | A | 11/1999 | Farwell | |
| 6,006,938 | A * | 12/1999 | Mozley | F16K 17/1606 137/68.19 |
| 6,070,365 | A * | 6/2000 | Leonard | B65D 90/36 52/1 |
| 6,149,053 | A * | 11/2000 | Chatterton | B65D 1/26 220/608 |
| 6,446,653 | B2 * | 9/2002 | Cullinane | F16K 17/1606 137/68.25 |
| 6,672,389 | B1 * | 1/2004 | Hinrichs | E21B 34/063 137/68.25 |
| 7,140,380 | B2 * | 11/2006 | Marubayashi | H01M 2/1241 137/68.25 |
| 7,234,481 | B2 * | 6/2007 | Henderson | F16K 17/162 137/68.26 |
| 7,600,527 | B2 * | 10/2009 | Shaw | B23K 26/364 137/68.26 |
| 8,091,574 | B2 * | 1/2012 | Melrose | F16K 17/1606 137/15.18 |
| 8,636,164 | B2 * | 1/2014 | Hernandez | F16K 17/1606 137/68.19 |
| 8,794,429 | B2 * | 8/2014 | Fischer | B65G 19/28 198/725 |
| 9,203,060 | B2 * | 12/2015 | Kim | H01M 2/023 |
| 9,347,576 | B2 * | 5/2016 | Walker | F16K 17/16 |
| 2008/0060702 | A1 * | 3/2008 | Muddiman | F16K 17/1606 137/68.27 |
| 2008/0289945 | A1 * | 11/2008 | Brazier | H01M 2/1229 200/83 R |
| 2010/0224603 | A1 * | 9/2010 | Modena | B23K 26/364 219/121.72 |
| 2013/0056085 | A1 * | 3/2013 | Tomasko | F16K 17/1606 137/14 |
| 2016/0018014 | A1 * | 1/2016 | Modena | F16K 17/1606 137/68.27 |

OTHER PUBLICATIONS

PCT International Preliminary Report on Patentability for International Application No. PCT/US2014/035510, dated Oct. 27, 2015 (7 pages).

* cited by examiner

FRUSTUM-SHAPED RUPTURE DISK HAVING LINE OF WEAKNESS

FIELD

The present disclosure relates to a frustum-shaped rupture disk having a line of weakness.

BACKGROUND

There are many types of systems that process, transport, store, or utilize a pressurized fluid. The pressurized fluid may be a liquid, gas, or a mixture of a liquid and gas. The pressurized fluid may also include solid components. For example, a system may transport a pressurized gas that includes solid particulates. As another example, a system may transport solid components in a pressurized-fluid environment. To ensure the safety of these types of pressurized systems, each such system typically includes a safety device designed to prevent (or at least provide an alarm indication during) the over-pressurization of the system. In an emergency situation, the pressure of the fluid acts on the safety device to create an opening to release fluid from the system. Outside of creating an opening, the safety device may simply provide an alert warning, indicating that a dangerous over-pressure situation is occurring or may be about to occur. In devices that actually rupture, or otherwise open, venting fluid to the environment or a safety reservoir through the opening reduces the pressure in the system and prevents another portion of the system from failing due to the high pressure of the fluid.

A rupture disk is one commonly used example of a safety device. A rupture disk can be attached to a pressurized system to expose a certain portion of the rupture disk to the pressurized fluid in the system. A portion of the rupture disk exposed to the fluid is configured to rupture or tear when the fluid reaches a predetermined pressure. The tearing or rupture of the disk creates an opening through which the pressurized fluid flows to reduce the pressure in the system. A rupture disk may include a scored line of weakness designed to ensure opening at a particular location, in response to a particular pressure, and in a particular "burst pattern." Typically, the scored line is provided by way of a laser, mechanical displacement or thinning, or chemical etching process that involves removing material from a portion of the disk. A line of weakness also may be created through a partial shearing process, as described in co-owned U.S. Pat. No. 5,934,308, the entire contents of which are hereby incorporated by reference as if set forth herein.

In the field of "reverse-buckling" rupture disk pressure relief devices, a concave/convex-shaped structure has been used as a means of providing a reliable and reproducible pressure responsive device. Known reverse-buckling devices are designed such that when the convex side of the structure is exposed to a predetermined overpressure force, the structure buckles and inverts, causing the convex side to collapse into a concave shape. The rupture disk may be designed not only to invert, but also to open by means of a line of weakness.

One type of concave/convex shaped reverse-buckling rupture disk is a frustum-shaped rupture disk. Examples of such a frustum-shaped reverse-buckling rupture disk are illustrated in FIG. 1A (PRIOR ART) and disclosed in commonly owned U.S. Pat. No. 4,576,303, and U.S. patent Ser. No. 12/149,691 (published as U.S. Pub. No. 2008/0289945 A1), the entire contents of each of which are hereby incorporated by reference. As disclosed in U.S. Pat. No. 4,576,303, and illustrated in FIG. 1A (PRIOR ART) and FIG. 1B (PRIOR ART), a known frustum-shaped reverse-buckling rupture disk 100 may include a flange portion 110, a frustum portion 130 in the shape of a truncated cone, and a central truncated portion 120. In use, the flange portion 110 may be clamped or otherwise attached to a pressurized system, with the frustum 130 and central 120 portions exposed to system pressure.

As shown in FIG. 1B (PRIOR ART), a known frustum-shaped buckling rupture disk also may include a scored line of weakness 135 in the transition between the central truncated portion 120 and the angled frustum portion 130 of the disk. Typically, the scored line is provided by way of a laser, mechanical displacement or thinning, or chemical etching process that involves removing material from the central truncated section of the frustum portion of the disk or etching a line of weakness of the desired shape.

In use, the convex face of the frustum portion of disk 100 is exposed to a pressure in a pressurized system. The angled frustum is the main control factor in determining the pressure or force load under which the frustum-shaped reverse-buckling disk will reverse and invert. This reversal is the initial factor leading to the disk 100 rupturing or opening along a line of weakness 135.

A frustum-shaped disk including the traditionally scored line of weakness of FIG. 1B may suffer from a number of drawbacks. Material displacement may undesirably deform the scored disk. Material displacement may lack precision, resulting in slight irregularities in the thickness of the remaining material. Such irregularities may include relatively thin portions in the line of weakness, which may prematurely tear (possibly creating a hole) during shipping, installation, or operation. Such irregularities also may include relatively thick portions, which may resist tearing beyond the pressure at which the disk is otherwise designed to rupture. Material displacement also may leave a "fold-over" or ridge of excess material at the edge of the line of weakness. Such excess material may visually mask imperfections in the line of weakness. Such excess material also may undesirably alter the pressure at which the line of weakness is intended to tear. A traditionally scored line may end abruptly, creating a corner at which the effects of pressure may be undesirably concentrated.

In the configuration illustrated in FIG. 1B, the line of weakness 135 is placed into tension when the central portion 120 is exposed to a pressurized system. Such a configuration may be suitable for a constant positive-pressure system (e.g., in a breathable air application). However, if system pressure fluctuates between negative and positive pressure, the line of weakness 135 may fatigue. Such fatigue may require the operating ratio of a rupture disk 100 to be much below the intended burst pressure. Operating ratio is the ratio between a peak applied pressure ($P_{max}$) during normal operation and a designed burst pressure ($P_{burst}$) of a rupture disk (i.e., $P_{max}/P_{burst}$). In a known frustum-shaped rupture disk 100, an operating ratio of at most eighty-five percent (85%) can be expected.

Also in the configuration illustrated in FIG. 1B, the line of weakness 135 is sensitive to the shape of the central portion 120. For example, shaping the central portion 120 into a domed shape (either during manufacture or use) can stretch and weaken the material at the line of weakness 135. As a result, the line of weakness 135 may tear or develop a pin hole leak at a lower pressure than the desired burst pressure.

There is a need for a pressure response structure that overcomes one or more of the deficiencies above and/or other deficiencies in the art, and/or provides additional benefits.

SUMMARY

According to one embodiment, a frustum-shaped rupture disk comprises a flange portion, a central truncated portion, and an angled frustum portion extending inwardly from the flange portion to the central truncated portion. The transition between the central truncated portion and the angled frustum portion contains a shear-scored line of weakness configured to open when the rupture disk responds to a predetermined pressure.

According to another embodiment, a frustum-shaped rupture disk comprises a flange portion, a central truncated portion having a shear-scored line of weakness, and an angled frustum portion extending inwardly from the flange portion to the central truncated portion.

A further embodiment of a frustum-shaped rupture disk comprises a flange portion, a central truncated portion, and an angled frustum portion extending inwardly from the flange portion to the central truncated portion. The angled frustum portion contains a shear-scored line of weakness configured to open when the rupture disk responds to a predetermined pressure.

In another embodiment, a frustum-shaped rupture disk comprises a flange portion, a central truncated portion, and an angled frustum portion extending inwardly from the flange portion to the central truncated portion. The transition between the flange portion and the angled frustum portion contains a shear-scored line of weakness configured to open when the rupture disk responds to a predetermined pressure.

In another embodiment, a frustum-shaped rupture disk comprises a flange portion, a central truncated portion, and an angled frustum portion extending inwardly from the flange portion to the central truncated portion. The flange portion contains a shear-scored line of weakness configured to open when the rupture disk responds to a predetermined pressure.

Yet another embodiment of a frustum-shaped rupture disk comprises a flange portion, a central truncated portion having a stiffening member, for example, a dome or rib feature, an angled frustum portion extending inwardly from the flange portion to the central truncated portion, and a line of weakness configured to open when the rupture disk responds to a predetermined pressure.

According to another embodiment, a frustum-shaped rupture disk comprises a flange portion, a central truncated portion, and an angled frustum portion extending inwardly from the flange portion to the central truncated portion. The central portion includes at least one wave configured to stiffen the central truncated portion.

BRIEF DESCRIPTION OF THE DRAWINGS

The accompanying drawings, which are incorporated in and constitute a part of this specification, illustrate several embodiments and together with the description, serve to explain the principles of the disclosure.

DESCRIPTION OF THE EMBODIMENTS

Figure 1A:
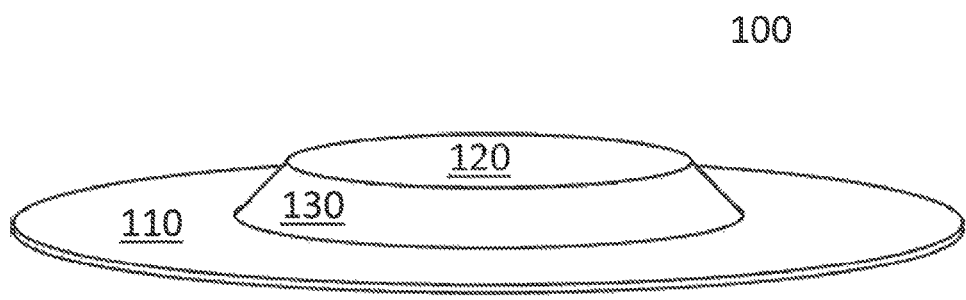
FIG. 1A (PRIOR ART) is an isometric view of a prior-art reverse-buckling frustum-shaped rupture disk.

Reference will now be made in detail to the present exemplary embodiments, examples of which are illustrated in the accompanying drawings. Wherever possible, the same reference numbers will be used throughout the drawings to refer to the same or like parts. The drawing figures of this application are intended to provide a general understanding of the working elements of the underlying system. Accordingly, unless explicitly stated, the figures do not represent a literal depiction of proportional dimensions or the precise locations for the illustrated inter-related components.

Figure 2A:
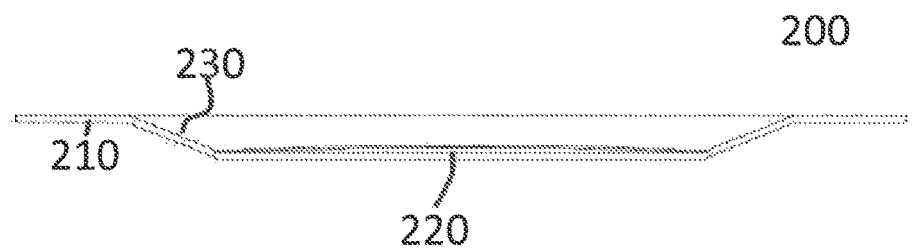
FIG. 2A is a section view of a frustum-shaped rupture disk having a shear-scored line of weakness at a transition between an angled frustum portion and a flat central portion.

FIG. 2A shows a section view of a rupture disk 200 according to one embodiment of the present disclosure. Rupture disk 200 forms a concave/convex-shaped structure including a flange portion 210 and a central truncated portion 220. An angled frustum portion 230 between the flange 210 and central truncated portion 220 provides a truncated-cone shape. A shear-scored line of weakness 235 is provided at the transition between the frustum portion 230 and central portion 220 of the rupture disk (as best illustrated in the isometric section view of FIG. 2B and the detail view of FIG. 2C). The shear-scored line of weakness may form a complete circle around the transition, or it may form only a partial circle. In one embodiment particularly suitable for high-pressure applications, the shear-scored line of weakness forms a half-circle. In another embodiment, the shear-scored line of weakness forms ¾ of a circle. When the shear-scored line of weakness forms only a partial circle, the remaining unscored arc may act as a hinge. When the rupture disk tears along the line of weakness, a hinge may prevent the torn material (known as a "petal") from completely separating from the rupture disk. Unlike a known line of weakness for a frustum-shaped rupture disk, the shear-scored line of weakness 235 is created by a partial-shearing process, which does not cut or remove material from the disk.

In one embodiment, the shear-scored line of weakness 235 is created by displacing material of the disk 200 to partially shear the disk material to create a line of weakness 235 with a cross-sectional area thinner than that of the un-sheared portions of the disk 200. The cross-sectional area of the line of weakness 235 may be selected to provide sufficient support to the rupture disk 200 under operating pressures, while allowing the disk 200 to tear along the line of weakness 235 upon reversal of the disk 200 in response to an overpressure condition.

Figure 2B:
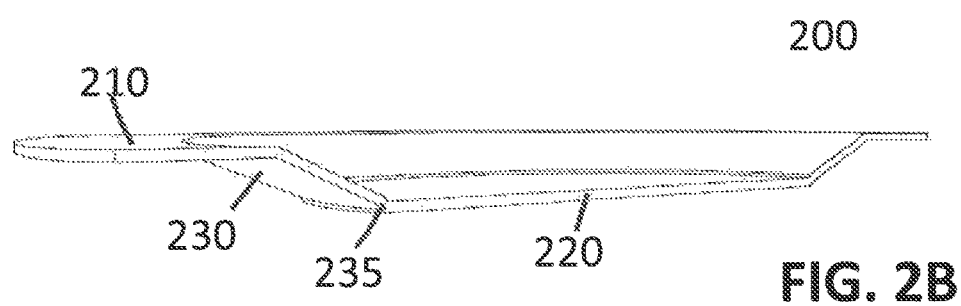
FIG. 2B is an isometric section view of the rupture disk of FIG. 2A.
Figure 2C:
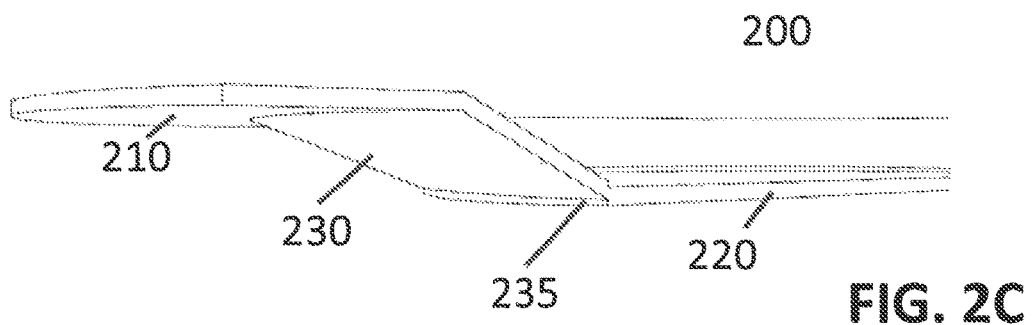
FIG. 2C is a detail isometric section view of the rupture disk of FIG. 2A.

Although FIGS. 2A-2C show a single shear-scored line of weakness 235, it is also contemplated that multiple lines of weakness may be provided on one or both of the concave and convex surfaces. In one embodiment, the planar angle of a shear score is parallel to the angled frustum portion. However, the shear score may be applied at any suitable angle relative to the angled frustum portion. Further, it is also contemplated that the profile of a shear-scored line of weakness may be varied. For example, the score may be stepped or graduated.

As illustrated in FIG. 2B, the shear-scored line of weakness 235 is illustrated with material (e.g., central truncated portion 220) displaced in shear towards the source of pressure. Similarly, FIG. 4D (discussed more fully below) illustrates a shear-scored line of weakness 435 with material (including the center-most area of the angled frustum portion 430) displaced in shear towards the source of pressure. And FIG. 12C (discussed more fully below) illustrates a shear-scored line of weakness 1235 with material (including angled frustum portion 1230) displaced in shear towards the source of the pressure. The disclosure, however, is not limited to a shear score applied in that direction. Thus, a shear-scored line of weakness may be created by displacing material in shear away from the source of pressure. Displacing material in shear away from the source of pressure may provide benefits, for example, where the operating pressure conditions are atmospheric or at least far below the desired burst pressure.

The frustum-shaped rupture disk 200 as illustrated in FIGS. 2A-2C has been found to be particularly suitable for a shear-scored line of weakness 235. In a conventional spherically domed rupture disk, a line of weakness is typically applied to a curved surface of the spherical dome. Applying a score, such as a shear score, to such a curved surface has proved difficult due to the variation in curvature from disk to disk. As illustrated in FIG. 2A, however, the shear-scored line of weakness 235 may be applied in a frustum-shaped rupture disk on a flat surface (e.g., at or near the transition between angled frustum portion 230 and central portion 220). As a result, it may be more economical, efficient, and reliable to apply a shear-scored line of weakness 235 to a frustum-shaped rupture disk 200.

A shear-scored line of weakness 235 may provide benefits over a traditionally formed line of weakness. For example, a shear-scored line of weakness 235 may leave a greater percentage of residual un-scored material. In one embodiment, as much as 300% or more additional material may remain in the scored area as compared to a traditional material-displacement method of scoring, which may help to avoid pin-holing, fold-over, or damage that may occur in a traditional material-displacement score. A shear-scored line of weakness 235 may result in less deformation than a line of weakness formed by material removal. A shear-scored line of weakness 235 may provide a smoother transition between the scored and unscored portion. Such a smooth transition may avoid sharp corners that may concentrate stresses. A shear-scored line of weakness also may provide a smooth, non-abrupt termination of the line of weakness 235, which may also avoid an undesirable concentration of stress. In contrast, a known line of weakness formed by material removal or displacement leaves an abrupt termination at the ends of the line of weakness, creating a corner at which the effects of pressure from the pressurized system may be concentrated. Further, material removal may lack precision, resulting in slight irregularities—including relatively thick or thin portions of the line of weakness—in the rupture disk. The increased precision of a shear-scored line of weakness may avoid such irregularities, thereby increasing the uniformity, parallelism, and evenness of a line of weakness, which may make the line of weakness more reliable. For example, using a shear-scored line of weakness may avoid creating relatively thin sections of the line of weakness (as may result from material removal) that can lead to premature tearing or the creation of a pinhole in the line of weakness.

One known line of weakness, created by mechanical cutting action or displacement, relies on an angular-shaped score blade to displace material in a linear manner in opposite directions from both surfaces of the blade. This process can lead to material being displaced by dragging thin portions of the disk member toward the score termination. The remaining displaced material can "fold over," creating a ridge of excess material at the edge of the line of weakness, which may obscure the score termination and/or hide possible defects in the score. Because a shear score does not rely on material removal or lateral displacement of material substantially in the plane of the material, and merely displaces disk material in opposite directions in response to the score punch, the shear-scored line of weakness 235 avoids the problems of material fold-over. Further, the traditional lateral-displacement score results in the creation of residual stresses within the disk structure which can have a detrimental effect on the operation of the pressure relief device. A shear score may avoid such residual stresses It has been observed that a shear-scored line of weakness 235 results in less variation in burst pressures: a range of approximately five percent or less, as compared to an approximately ten percent variation in burst pressure resulting from a traditional score line formed by material removal or displacement. It also has been observed that a shear-scored line of weakness 235 is more robust and is less susceptible to premature failure than is a traditional score line formed by material removal or displacement.

While rupture disk 200 is illustrated as having a central truncated portion 220 that is generally concentric with the flat flange portion 210 and angled frustum portion 230, a truncated portion may be offset from the center of the flat flange portion and/or angled frustum portion. An example of an offset central truncated portion in a rupture disk is shown in co-owned U.S. Pat. No. 5,678,307, the entire contents of which are hereby incorporated as if fully set forth herein.

In operation, the angled frustum portion 230 may collapse in response to a predetermined pressure (i.e., the activation pressure), causing the disk 200 to reverse. When the disk 200 reverses, the system pressure imparts a shear and/or tensile force onto the line of weakness 235, leading the line of weakness 235 to tear. The angle of the frustum portion 230 and the thickness of the disk 200 are two factors that may be varied to achieve a desired activation pressure.

Figure 3:
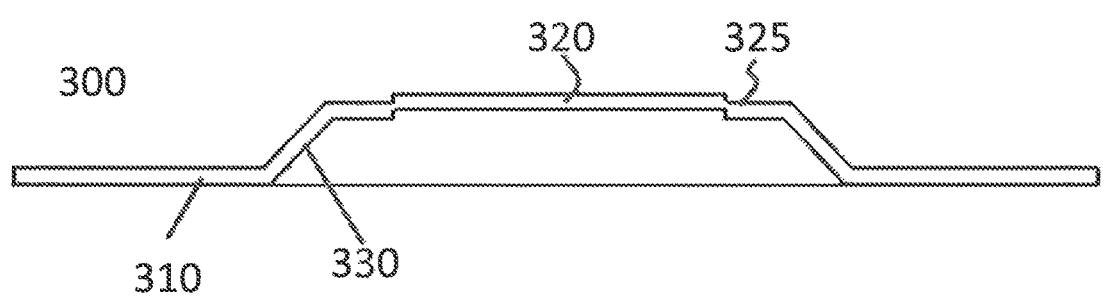
FIG. 3 is a section view of a frustum-shaped rupture disk having a shear-scored line of weakness in a flat central portion.

Although the shear-scored line of weakness of FIGS. 2A-2C is illustrated at a transition, it is also contemplated that a shear-scored line of weakness may be provided in the central portion. For example, FIG. 3 illustrates a frustum-shaped rupture disk having an exterior flange portion 310 and a flat central portion 320. An angled frustum portion 330 between the flange 310 and central portion 320 provides a truncated-cone shape. A shear-scored line of weakness 325 is provided in the flat central portion 320. Indeed, the disclosure contemplates that a shear-scored line of weakness may be provided in any suitable portion of a frustum-shaped rupture disk. Further, a combination of multiple shear-scored lines of weakness may be used.

Figure 4A:
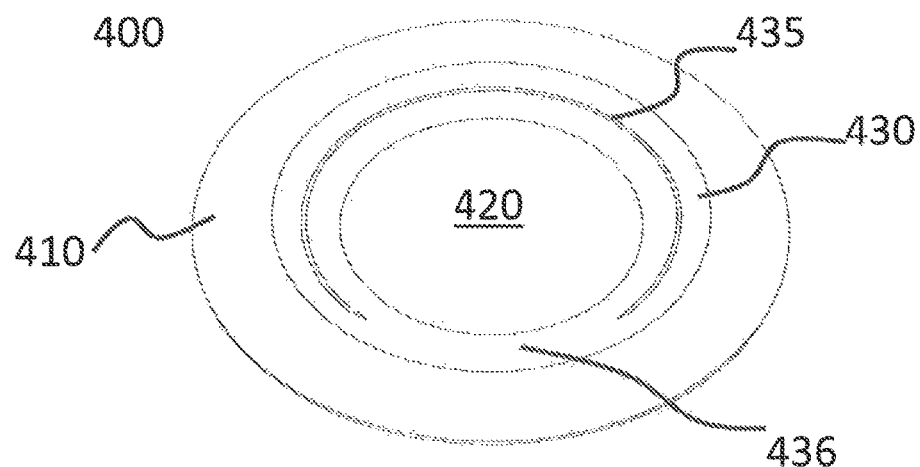
FIG. 4A is an isometric view of a frustum-shaped rupture disk having a shear-scored line of weakness in an angled frustum portion.
Figure 4B:
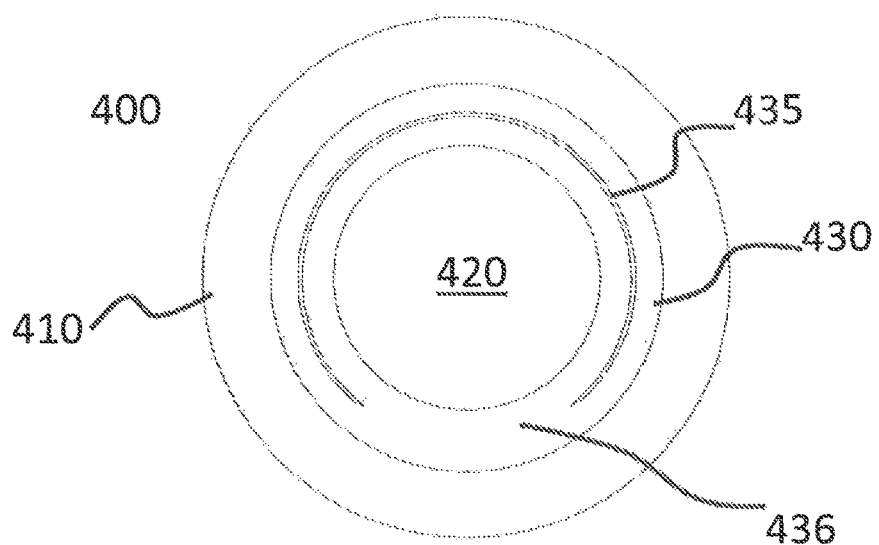
FIG. 4B is a profile view of the rupture disk of FIG. 4A.
Figure 4C:
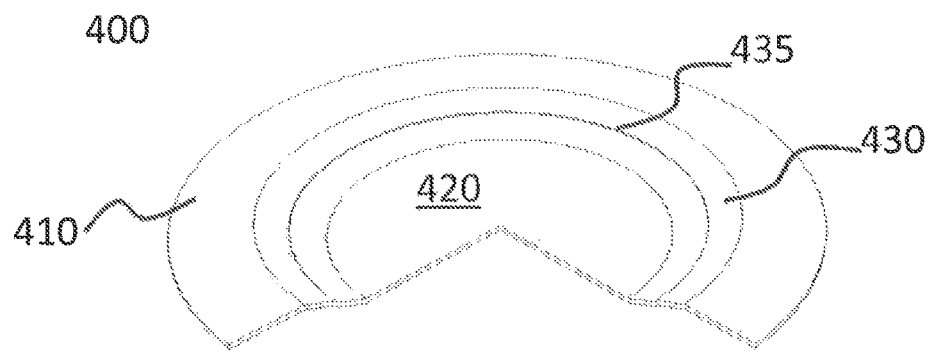
FIG. 4C is an isometric section view of the rupture disk of FIG. 4A.
Figure 5:
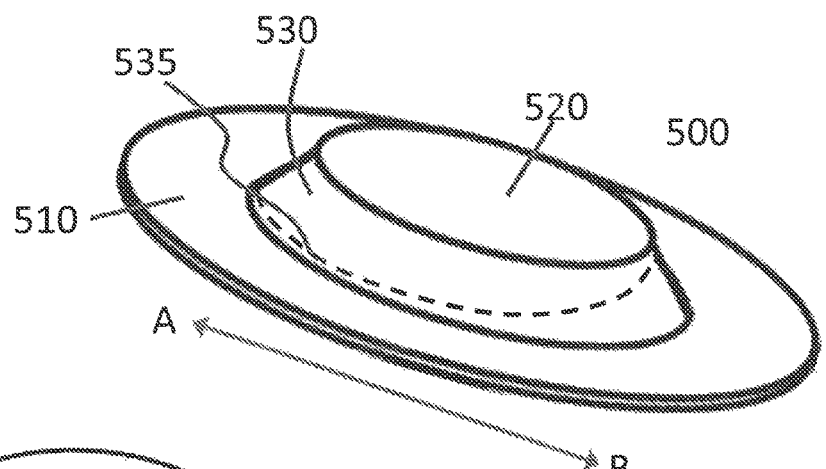
FIG. 5 is an isometric view of another frustum-shaped rupture disk containing a non-concentric or irregular shaped shear-scored line of weakness.
Figure 6:
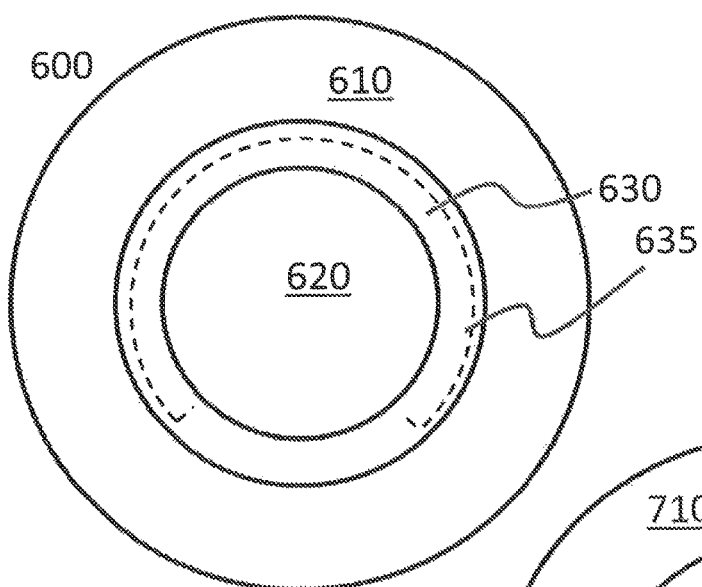
FIG. 6 is a plan view of another scored frustum-shaped rupture disk containing a variation of a C-shaped shear-scored line of weakness.
Figure 7:
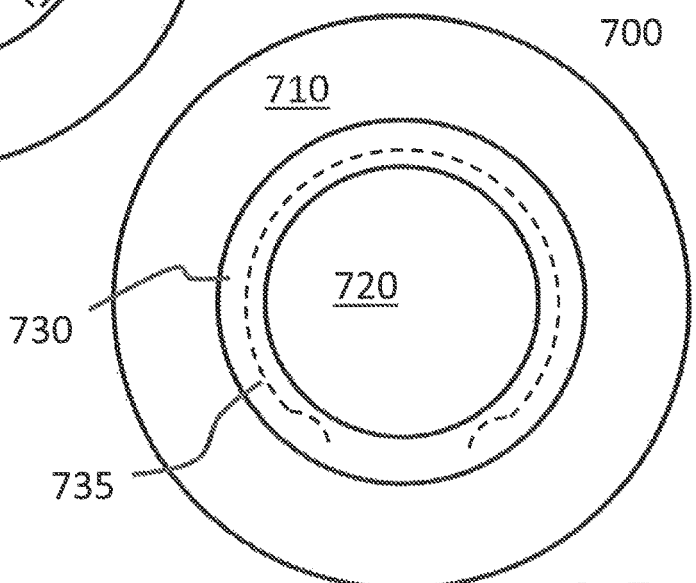
FIG. 7 is a plan view of another scored frustum-shaped rupture disk containing a variation of a C-shaped shear-scored line of weakness.

FIG. 4A shows an isometric view of a rupture disk 400 according to another embodiment of the present disclosure. Rupture disk 400 comprises a concave/convex shaped structure including an exterior flange portion 410 and a flat central portion 420. An angled frustum portion 430 between the flange 410 and central portion 420 provides a truncated-cone shape. As illustrated, a C-shaped line of weakness 435 is provided in the angled frustum portion 430 of the rupture disk, leaving an unweakened hinge portion 436. The rupture disk 400 of FIG. 4A also is illustrated in FIGS. 4B and 4C, which also illustrate the line of weakness 435. Although the line of weakness 435 is illustrated as C-shaped, it is contemplated that a line of weakness may take other shapes. In one embodiment, a line of weakness may form a complete circle, without leaving a hinge portion. In another embodiment, a line of weakness may form a half-circle. The line of weakness may be oval-shaped, polygon-shaped, symmetrical, asymmetrical, or any other suitable shape, non-limiting examples of which are illustrated in FIGS. 5, 6, and 7.

Figure 4D:
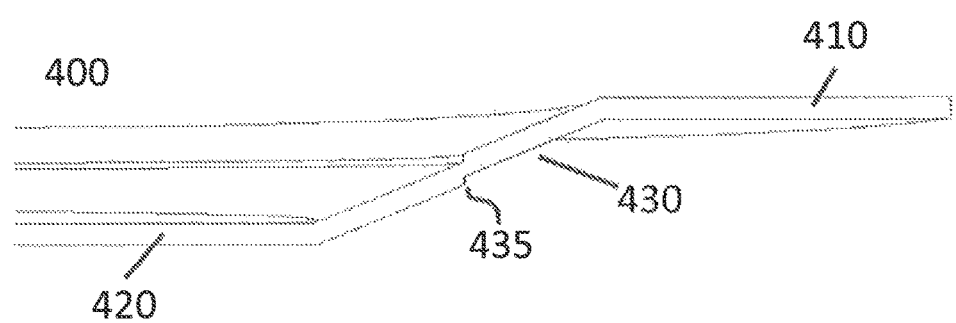
FIG. 4D is a detail isometric section view of the rupture disk of FIG. 4A.

As illustrated in FIG. 4A, the C-shaped line of weakness 435 is a shear-scored line of weakness with a generally stepped shape (best illustrated in FIG. 4D) that has been thinned in a partially sheared region. FIG. 4D is a detailed partial cross-section of the angled frustum portion 430 showing the thinning at the shear-scored line of weakness 435. It is also contemplated that a line of weakness in the angled frustum portion of a frustum-shaped rupture disk may be formed by traditional mechanisms (e.g., material displacement or thinning, etching, laser ablation).

Although FIG. 4A shows a shear-scored line of weakness 435 applied to the concave surface (i.e., the punch is applied to the concave surface), it is also contemplated that a shear-scored line of weakness may be applied to the convex surface of a rupture disk to form a shear-scored line of weakness. It is further contemplated that multiple lines of weakness may be provided on one or both of the concave and convex surfaces.

Figure 4E:
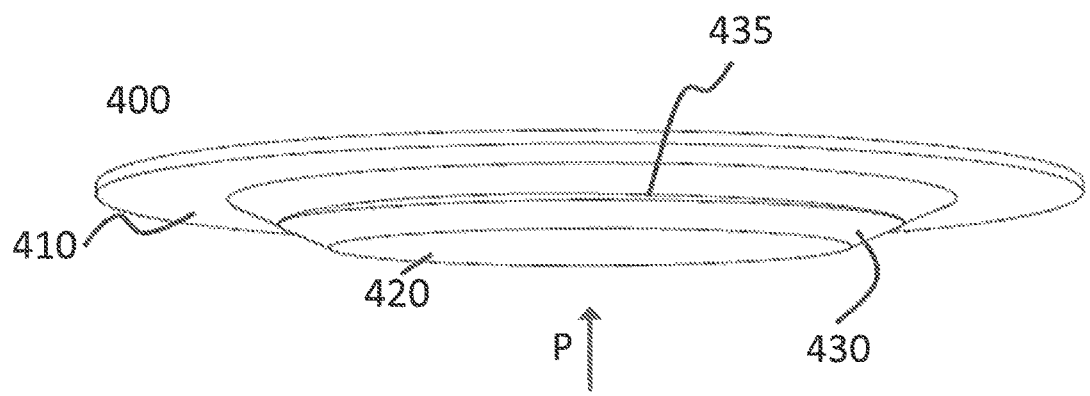
FIG. 4E is another isometric view of the rupture disk of FIG. 4A.

In use, the flat central portion 420 may be exposed to a pressure P in a pressurized system, as illustrated in FIG. 4E. When a predetermined set pressure condition (i.e., an activation pressure) is reached, rupture disk 400 may activate in the direction of arrow P (as illustrated in FIG. 4E). During activation, the frustum portion 430 may collapse, which causes central portion 420 to move in the direction of arrow P. Also during activation, the rupture disk may tear along the line of weakness 435. The angle of the frustum portion 430 and the thickness of the disk 400 are two factors that may be varied to achieve a desired activation pressure.

Figure 1B:
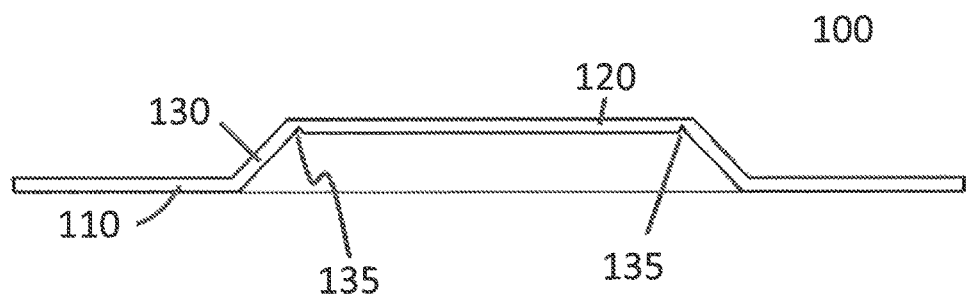
FIG. 1B (PRIOR ART) is a section view of the prior-art reverse-buckling frustum-shaped rupture disk of FIG. 1A.

Placing a line of weakness 435 in the angled frustum portion 430 as illustrated in FIGS. 4A-4E may provide benefits over a known frustum-shaped rupture disk (e.g., FIG. 1B). Such a line of weakness 435 provides for a larger area of opening when the rupture disk 400 opens. A larger area of opening may be desirable to allow quick venting and/or increased flow of a pressure from a pressurized system. The placement of line of weakness 435 also may insulate the line of weakness 435 from changes to the shape of the central portion 420. As positioned in the known rupture disk of FIG. 1B, the line of weakness 135 may be stretched or weakened if the central portion 120 is shaped into a domed shape (either during manufacture or use). In contrast, placing a line of weakness 435 in the angled frustum portion 430 makes the line of weakness 435 independent of the shape of the central portion 420. Manufacturing costs may be reduced because the central portion 420 may be shaped without regard for the line of weakness 435. In addition, the central portion 420 may be formed into various shapes (as illustrated, e.g., in FIGS. 8A-11B, discussed below) or provided with strengthening features (as illustrated, e.g., in FIGS. 15A-17B, discussed below) to achieve enhanced disk performance without affecting the strength of the line of weakness 435.

Placing a line of weakness 435 in the angled frustum portion 430 also may offer increased protection of the line of weakness 435. The central portion 420 and flange portion 410 of a rupture disk 400 may be subjected to damaging contact during processing, shipping, handling, installation, and use, whereas the angled frustum portion 430 may not. For example, the central portion 420 and flange portion 410 may rest against the bottom of a shipping box, or may be manually touched by personnel installing the rupture disk 400. Each such contact could compromise or damage a line of weakness placed in the central portion or flange portion of a frustum-shaped rupture disk. By placing a line of weakness 435 in the angled frustum portion 430, the line of weakness 435 may be protected against such compromising or damaging contact.

Placing a line of weakness in the angled frustum portion 430 as illustrated in FIGS. 4A-4E provides an unexpected benefit of increased stability compared to a known frustum-shaped rupture disk (e.g., FIG. 1B). In a known frustum-shaped rupture disk 100, positioning the scored line of weakness 135 at a transition between an angled frustum portion 130 and a central portion 120 places the line of weakness 135 in tension, concentrates stress on the line of weakness 135, and creates a risk of fatigue from pressure fluctuations. In contrast, the line of weakness in the angled frustum portion 430 of FIG. 4A is placed in compression when positive pressure is applied to the convex surface of the disk 400, eliminating the fatigue effects that pressure fluctuations can impart on a tensioned line of weakness. As a result, the rupture disk illustrated in FIG. 4A may provide a desirably increased operating ratio as compared to a known rupture disk (e.g., FIG. 1B). In one embodiment, the operating ratio may be as high as 90 or 95 percent.

Figure 4F:
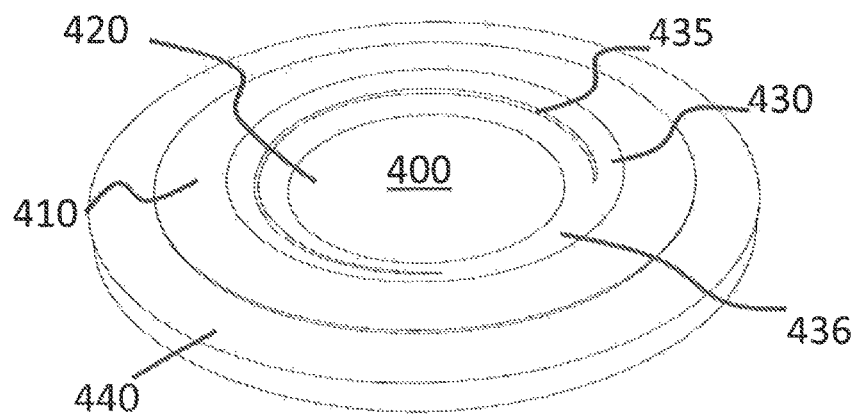
FIG. 4F is an isometric view of an assembly including the rupture disk of FIG. 4A installed with an inlet member.
Figure 4G:
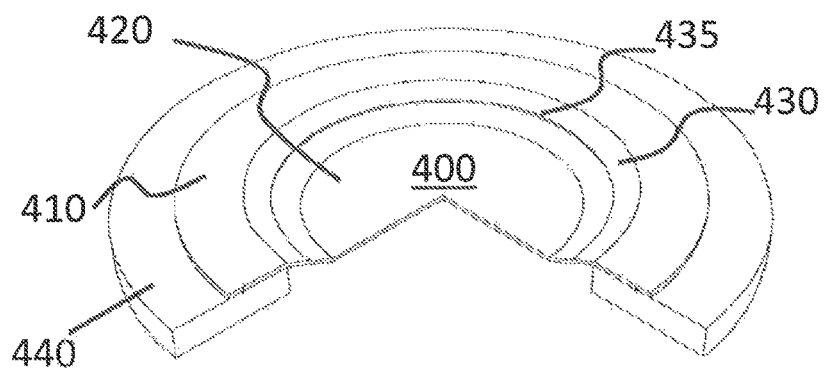
FIG. 4G is an isometric section view of the assembly of FIG. 4F.
Figure 4H:
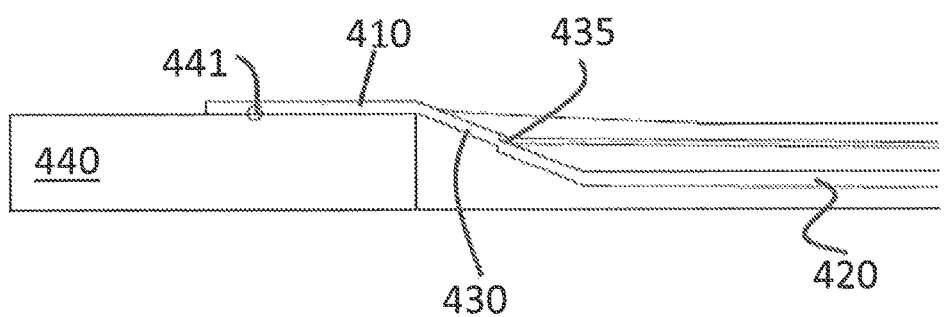
FIG. 4H is a detail section view of the assembly of FIG. 4F.

A scored frustum-shaped rupture disk may be supplied as part of an overall assembly, including one or more of an inlet component and an outlet component. For example, in one embodiment, a rupture disk 400 may be bonded with an inlet 440 of a pressurized system, as illustrated in FIGS. 4F, 4G, and 4H. The angled frustum portion 430 and central portion 420 of the rupture disk 400 may extend into the center of inlet 440. In one embodiment, the flange 410 of rupture disk 400 may be welded to the inlet 440 at weld 441. Additionally or alternatively, any suitable mechanism for bonding the rupture disk 400 to inlet 440 may be used. For example, the rupture disk 400 may be bonded by way of an adhesive, or by soldering. The rupture disk 400 also may be crimped or clamped to inlet 440 by a crimping or clamping mechanism.

When a rupture disk 400 is used in conjunction with an inlet 440, the location at which the disk 400 and inlet 440 are bonded may influence the pressure at which the rupture disk 400 will reverse. For example, if a weld is applied toward the center of the flange portion 410 of the disk 400, the weld may act as the support for the entire disk member 400. In a known reverse-buckling disk, a separate outlet structure is required to provide support to a rupture disk mounted on an inlet; however it has been found that joining the flange portion 410 of disk 400 directly to the outlet may increase intrinsic stability, and may function without an outlet support member when a shear score is placed in the transition or flat flange area of the disk. This support mechanism created by the weld can be both symmetric and non-symmetric in physical structure. For example, the weld between the flange and inlet may be circular, oval, irregular, or any other suitable shape.

Figure 4I:
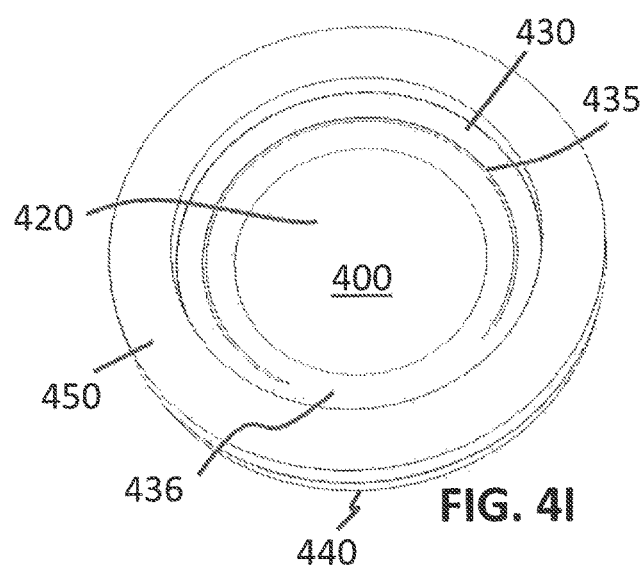
FIG. 4I is an isometric view of an assembly including the rupture disk of FIG. 4A installed with an inlet member and an outlet member.
Figure 4J:
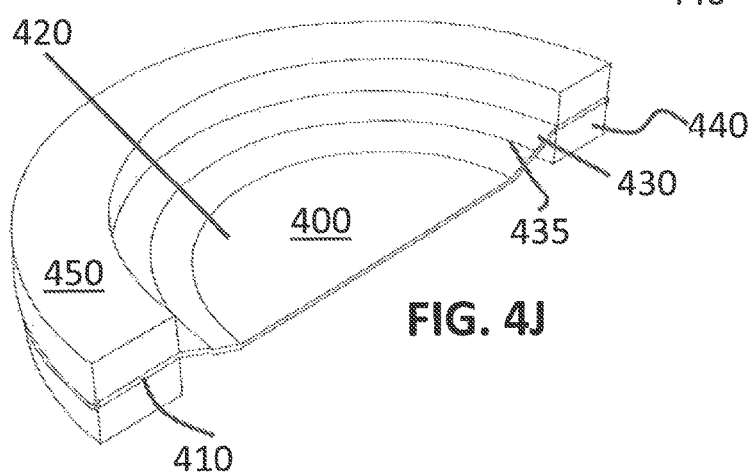
FIG. 4J is an isometric section view of the assembly of FIG. 4I.
Figure 4K:
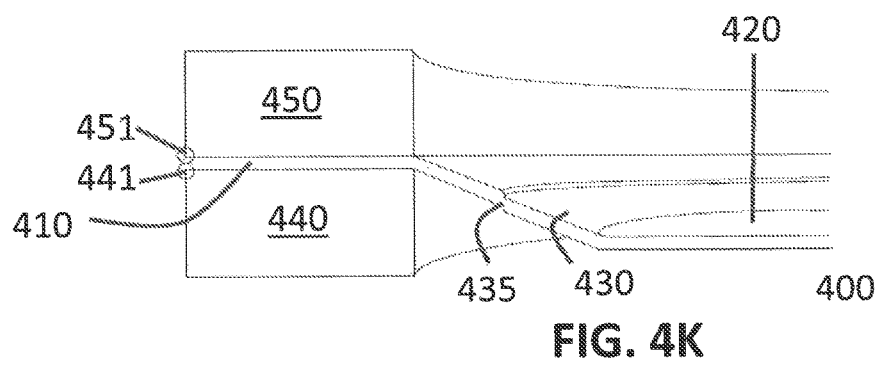
FIG. 4K is a detail section view of the assembly of FIG. 4I.

In another embodiment, a rupture disk 400 may be bonded with an inlet 440 and an outlet 450 of a pressurized system, as illustrated in FIGS. 4I, 4J, and 4K. The angled frustum portion 430 and central portion 420 of the rupture disk 400 may extend into the center of inlet 440. As illustrated in FIG. 4K, the flange 410 of rupture disk 400 may be welded to the inlet 440 at weld 441 and to the outlet at weld 451. As illustrated in FIGS. 4I, 4J, and 4K, the flat central portion 420 may be exposed to a pressure in a pressurized system. The rupture disk 400 may be configured to reverse and/or rupture in response to a predetermined pressure in the pressurized system.

The outlet 450 may be provided with a stress-concentration point (also known as a stress riser) to make contact with the rupture disk upon reversal. The stress-concentration point may concentrate stresses where it contacts the reversed rupture disk, thereby initiating rupture and/or tearing along the line of weakness 435. Additionally or alternatively, the outlet 450 may be provided with a cutting member configured to cut the rupture disk 400 upon reversal. Further, an outlet 450 may be provided with a catcher bar or hinge member designed to catch a ruptured portion (or "petal") of the rupture disk 400 after rupture. A stress concentration point, cutting member, catcher bar, or hinge member may be provided as part of the outlet 450 or as an additional component used in conjunction with the outlet 450. A stress-concentration point, cutting member, or hinge member may be used singly or in any combination of the above. For example, two stress-concentration points may be used in conjunction with a single hinge member, etc.

An outlet 450 may provide support to the disk 400 under pressurization. Whereas a weld or bond between a disk and an inlet may influence the pressure at which the disk activates, the bonding between an outlet 450 and disk 400 may have little impact on the pressure at which the disk 400 will activate.

Although a weld 441, 451 is illustrated, a rupture disk 400 may be bonded to inlet 440 or outlet 450 by any suitable mechanism, such as an adhesive, or by soldering. A rupture disk also may be crimped or clamped between an inlet and outlet. In one embodiment, a screw-thread compression may be used to clamp a rupture disk between an inlet and an outlet.

Figure 4L:
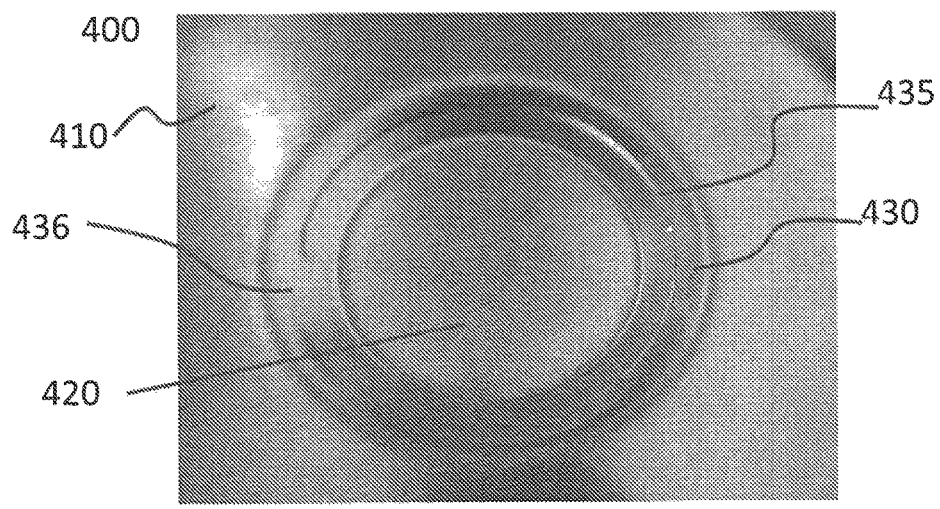
FIG. 4L is a concave-side view of a frustum-shaped rupture disk having a shear-scored line of weakness applied in the angled frustum portion.

FIG. 4L illustrates a concave-side view of a rupture disk 400 having a flange portion 410, central portion 420, and an angled frustum portion 430. A shear-scored line of weakness 435 is provided on the frustum portion 430. The line of weakness 435 forms less than a complete circle, leaving an unscored portion 436 that may act as a hinge to retain a the ruptured portion (petal) when the line of weakness 435 tears.

Figure 4M:
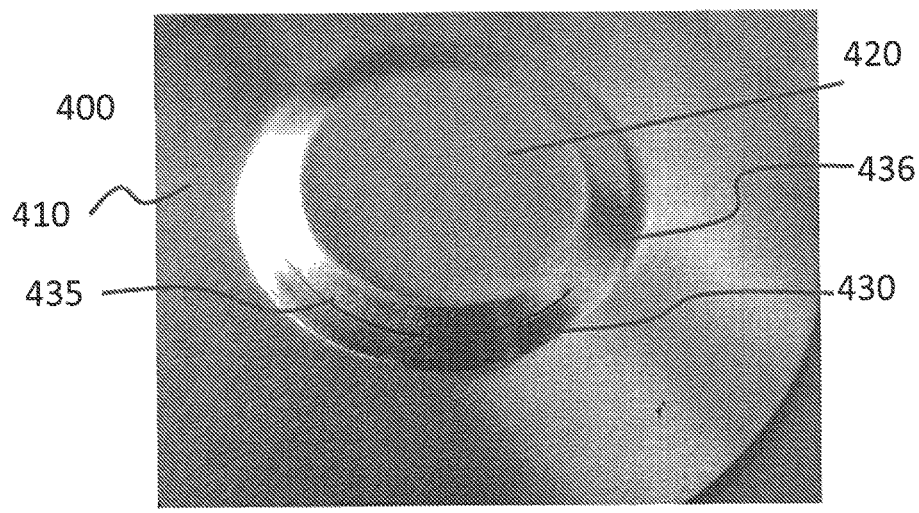
FIG. 4M is a convex-side view of a frustum-shaped rupture disk having a shear-scored line of weakness applied in the angled frustum portion.

FIG. 4M illustrates a convex-side view of a rupture disk 400 having a flange portion 410, central portion 420, and an angled frustum portion 430. A shear-scored line of weakness 435 is provided on the frustum portion 430. The line of weakness 435 forms less than a complete circle, leaving an unscored portion 436 that may act as a hinge to retain a the ruptured portion (petal) when the line of weakness 435 tears.

Figure 4N:
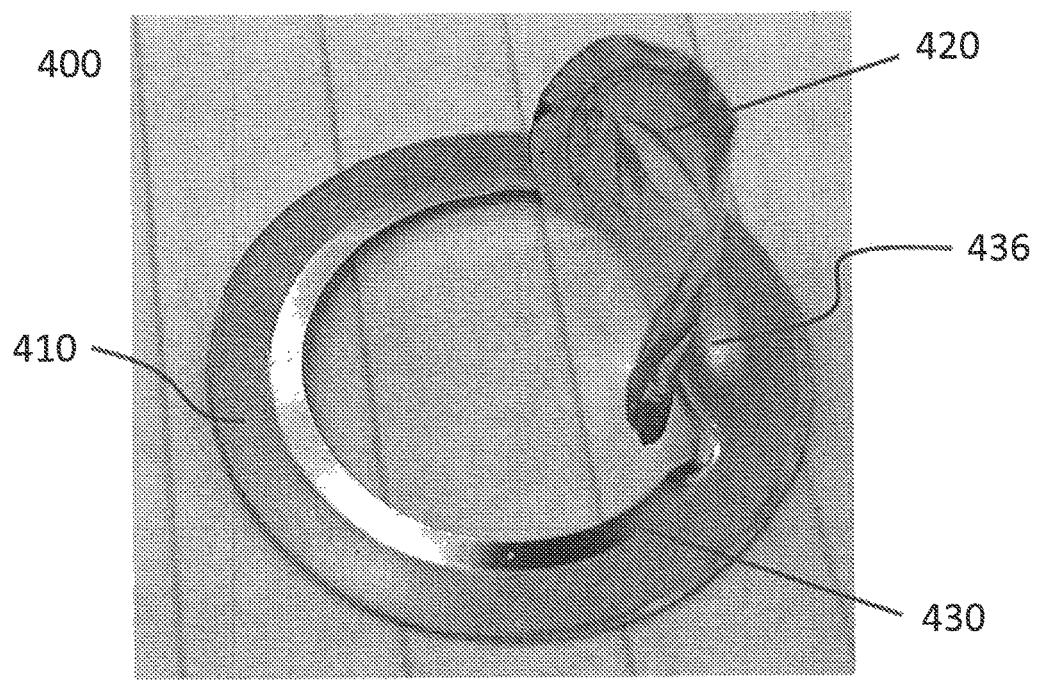
FIG. 4N is a view of a frustum-shaped rupture disk after activation.

FIG. 4N illustrates a view of a rupture disk 400 after activation. As illustrated, a central portion 420 has partially torn away from the angled frustum portion 430 and flange portion 410, forming a petal retained by hinge 436.

Although the line of weakness 435 is illustrated as being concentric with the rupture disk 400, the disclosure is not so limited. For example, a generally circular line of weakness may be offset from the center of the rupture disk, as illustrated in FIG. 5. FIG. 5 illustrates a frustum-shaped rupture disk 500 having a flange portion 510, central portion 520, and a line of weakness 535 in an angled frustum portion 530. The line of weakness 535 extends outward along the angled frustum portion 530 further in one direction (direction A) than in another direction (direction B). As another example, illustrated in FIG. 6, the ends of a line of weakness 635 in an angled frustum portion 630 may turn inward toward a central portion 620 (and away from a flange portion 610) of the rupture disk 600. As another example, illustrated in FIG. 7, the ends of a line of weakness 735 in an angled frustum portion 730 may turn outward away from the central portion 720 (and toward a flange portion 710) of the rupture disk 700.

Figure 8A:
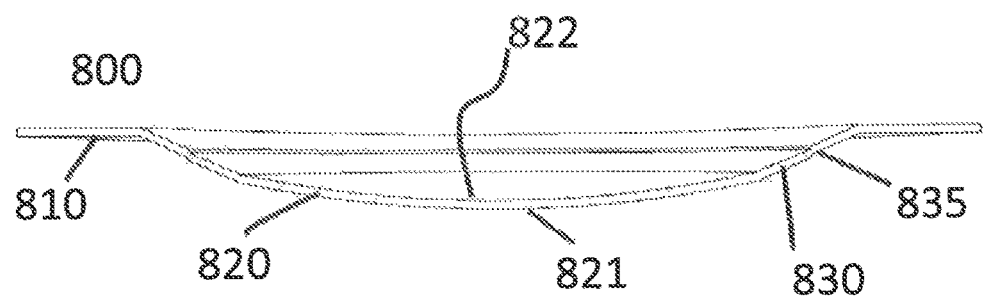
FIG. 8A is a section view of a frustum-shaped rupture disk having a spherical central portion.
Figure 8B:
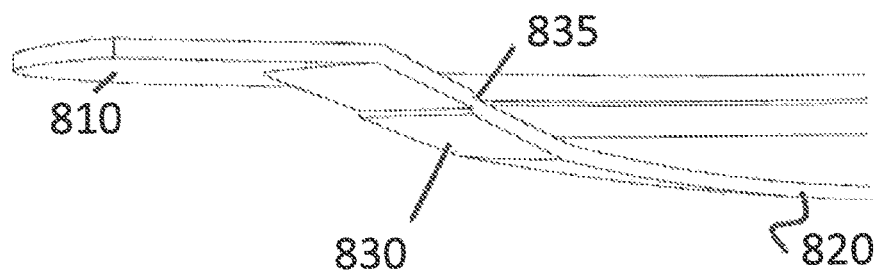
FIG. 8B is a detail isometric section view of the rupture disk of FIG. 8A.

As noted above, providing a line of weakness in the angled frustum portion of a rupture disk may allow the central portion to be shaped to achieve certain design goals, without impacting the integrity of the line of weakness. One example of a shaped central portion is shown in FIGS. 8A-8B. FIG. 8A shows a frustum-shaped rupture disk 800 including a central portion 810 that is in the shape of a dome having a convex surface 821 and a concave surface 822. As shown in FIG. 8B, a shear-scored line of weakness 835 is provided in the angled frustum portion 830 of the rupture disk 800; however, a traditional line of weakness may also be used. The disk 800 may be installed with the convex surface 821 exposed to a pressurized system. A domed central portion 810 may protect the central portion 810 from pressure fluctuations that might otherwise compromise a flat central portion (e.g., central portion 410 in FIG. 4A). A domed frustum-shaped rupture disk 800 may also be used in place of a domed (non-frustum) rupture disk. A domed frustum-shaped rupture disk 800 may be thicker than a domed rupture disk, but still reverse and rupture at the same pressure. Thus, a domed frustum-shaped rupture disk 800 may be thicker and more resistant to damage than an equivalent domed rupture disk. A domed frustum-shaped rupture disk 800 also is particularly suitable for mass manufacture.

Figure 9A:
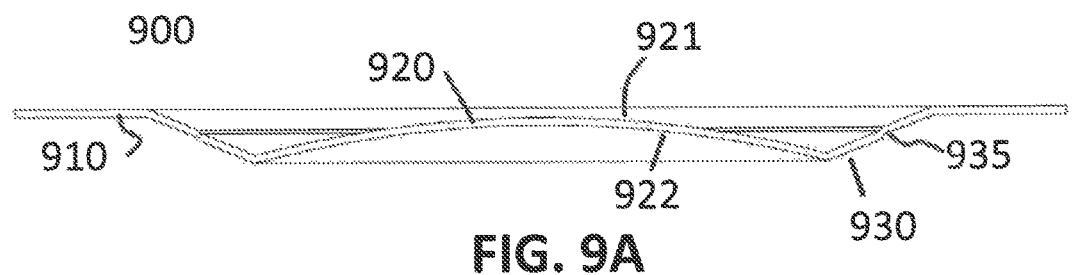
FIG. 9A is a section view of a frustum-shaped rupture disk having an inverted spherical central portion.
Figure 9B:
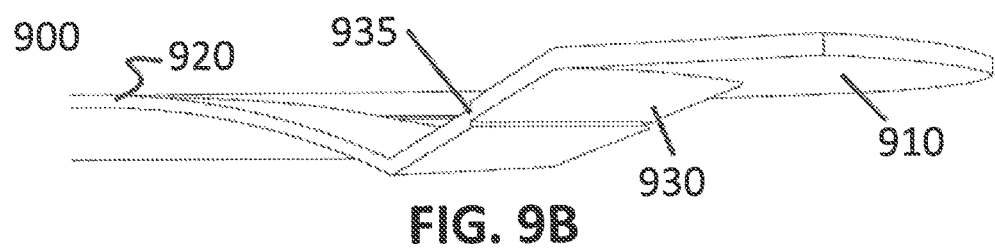
FIG. 9B is a detail isometric section view of the rupture disk of FIG. 9A.

As another example of a shaped central portion, FIGS. 9A and 9B illustrate a frustum-shaped rupture disk 900 including a flange portion 910 and a central portion 920 that is in the shape of an inverted dome. The inverted dome has a convex surface 921 and a concave surface 922. As best shown in FIG. 9B, a shear-scored line of weakness 935 is provided in an angled frustum portion 930 of the rupture disk 900. In another embodiment, a traditional line of weakness may be used. The disk 900 may be installed with the concave surface 922 exposed to a pressurized system. An inverted dome may offer enhanced resistance to back pressures (i.e., positive pressures applied to the concave surface 922 and/or negative pressure applied from the convex surface 921).

Figure 9C:
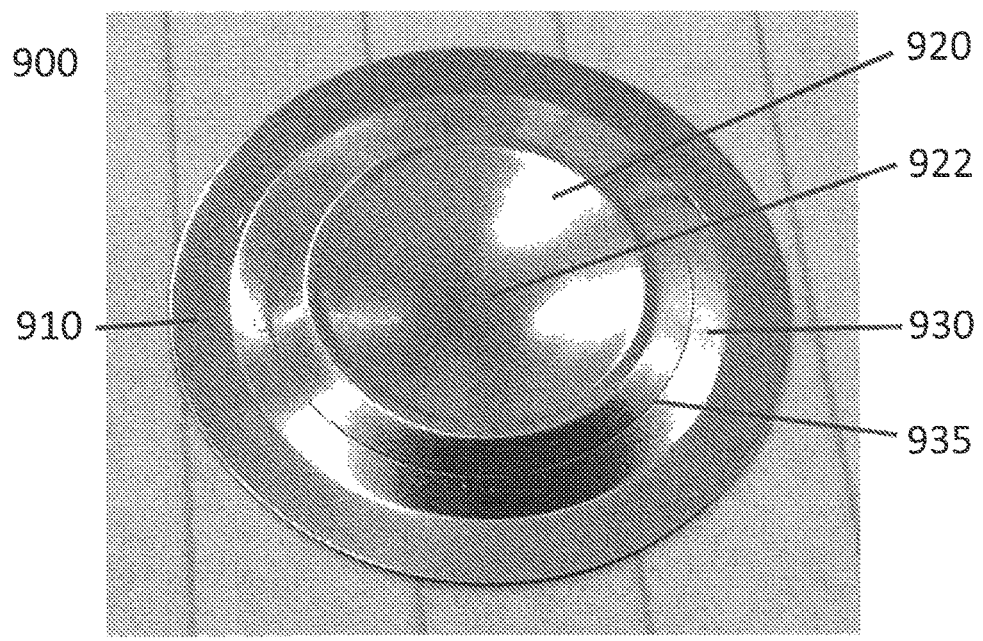
FIG. 9C is another view of a frustum-shaped rupture disk having an inverted spherical central portion.
Figure 9D:
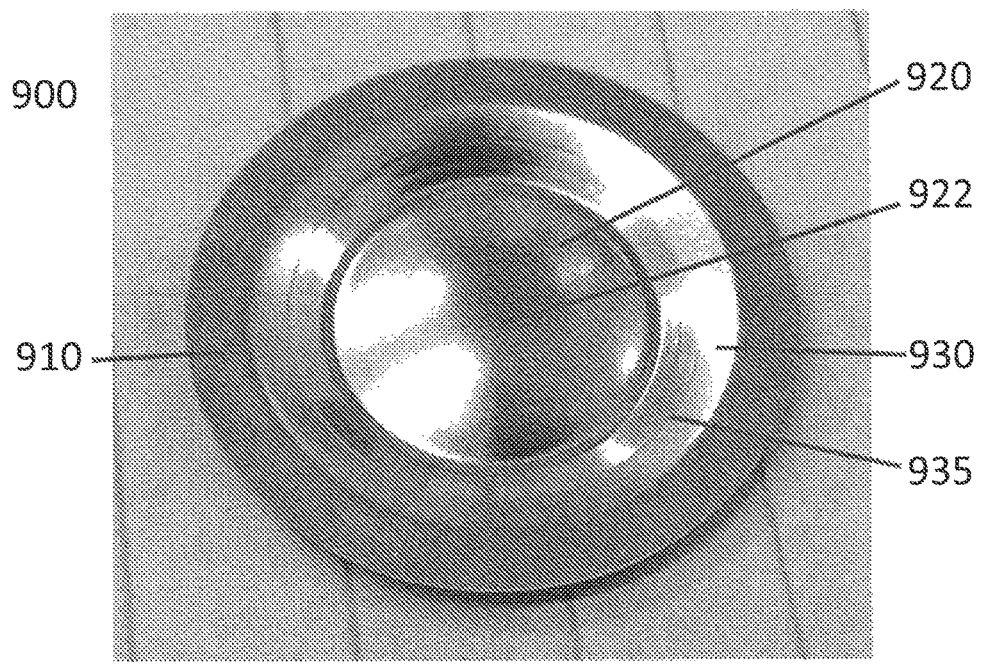
FIG. 9D is still another view of a frustum-shaped rupture disk having an inverted spherical central portion.

FIGS. 9C and 9D provide additional views of a rupture disk having a shaped central portion 920 in the form of an inverted dome 920. As illustrated, only the concave surface 922 of the central portion 920 is visible. A flange portion 910, angled frustum portion 930, and shear-scored line of weakness 935 are also shown.

Figure 10A:
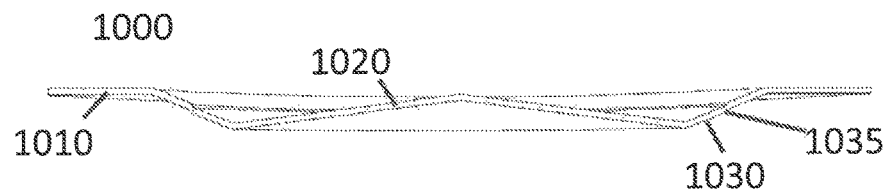
FIG. 10A is a section view of a frustum-shaped rupture disk having an inverted conical central portion.
Figure 10B:
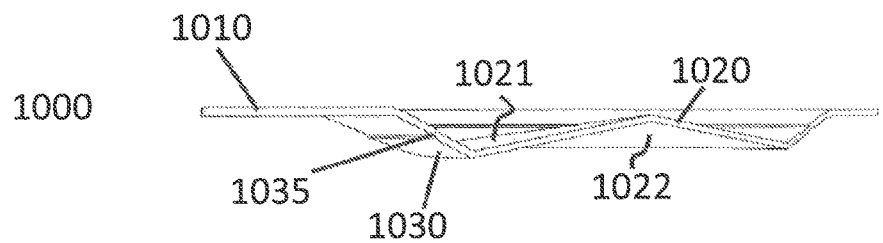
FIG. 10B is an isometric section view of the rupture disk of FIG. 10A.

As yet another example of a shaped central portion, FIGS. 10A and 10B illustrate a frustum-shaped rupture disk 1000 including a flange portion 1010 and a central portion 1020 that is in the shape of a conical dome. The conical dome has a convex surface 1021 and a concave surface 1022. A shear-scored line of weakness 1035 is illustrated in the angled frustum portion of the rupture disk 1000; however, a traditional line of weakness also may be used. The disk 1000 may be installed with the concave surface 1022 exposed to a pressurized system. A conical dome may offer enhanced resistance to back pressures (i.e., pressures applied to the convex surface 1021).

Figure 11A:
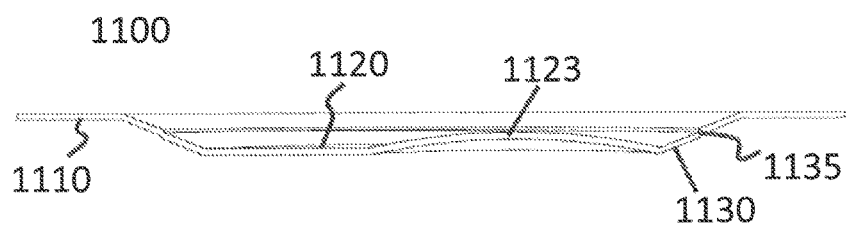
FIG. 11A is a section view of a frustum-shaped rupture disk having an offset inverted spherical central portion.
Figure 11B:
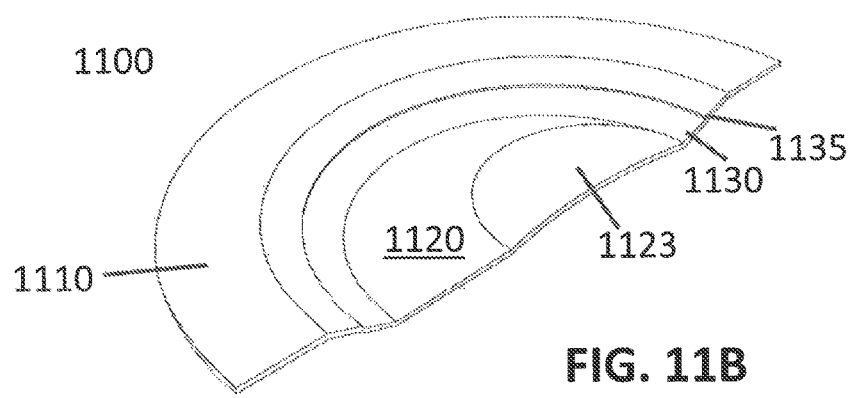
FIG. 11B is an isometric section view of the rupture disk of FIG. 11A.

While a rupture disk may include a central portion with a centered dome-shape (e.g., FIGS. 8A-10B), a dome shape may be provided offset from the center of the central portion. For example, FIGS. 11A-11B illustrate a rupture disk 1100 having a central portion 1120 and a flat flange portion 1110. A line of weakness 1135 is provided in an angled frustum portion 1130. The central portion 1120 includes a domed portion 1123 offset from the center of the central portion 1120. Although the offset dome portion 1123 in FIGS. 11A and 11B is illustrated as a spherical dome, it is also contemplated to use a conical dome or other suitable geometry. Reversal of the rupture disk may initiate at the offset dome portion 1123. Thus, the disclosure contemplates using features to manipulate the point or points at which reversal of the rupture disk may be initiated. It may be desirable to control a reversal-initiation point, for example, if a rupture disk is used with a cutting member, a catching member, or a hinge member whose performance may depend on the point at which reversal initiates.

Figure 12A:
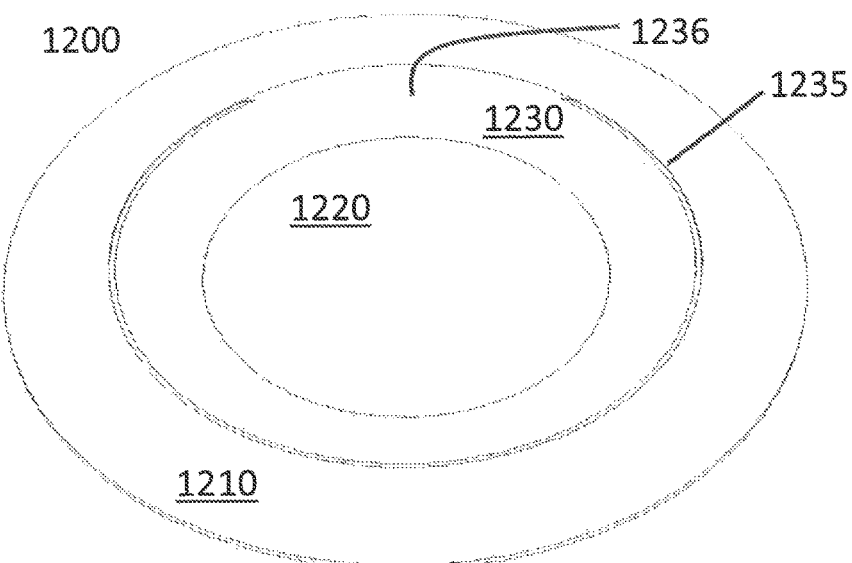
FIG. 12A is an isometric view of a frustum-shaped rupture disk having a shear-scored line of weakness in a transition between an angled-frustum portion and a flange portion.
Figure 12B:
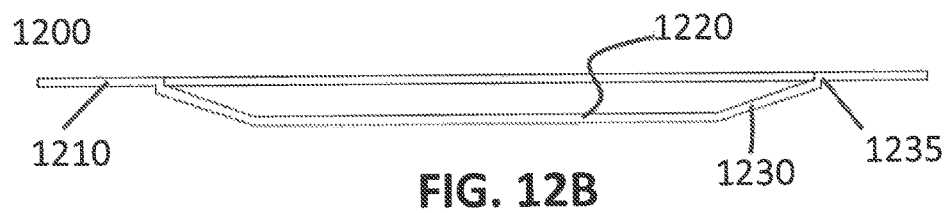
FIG. 12B is a section view of the rupture disk of FIG. 12A.
Figure 12C:
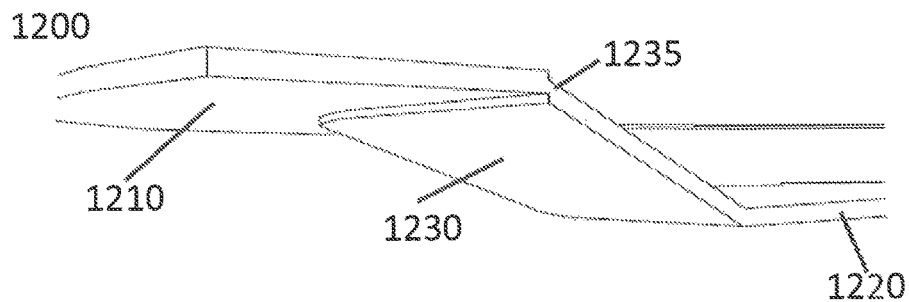
FIG. 12C is a detail isometric section view of the rupture disk of FIG. 12A.

FIGS. 12A, 12B, and 12C illustrate a frustum-shaped rupture disk 1200 having a concave/convex shaped structure including an exterior flange portion 1210 and a flat central portion 1220. An angled frustum portion 1230 between the flange 1210 and central portion 1220 provides a truncated-cone shape. A shear-scored line of weakness 1235 is provided at or near a transition between the angled frustum portion 1230 and flange portion 1210 of the rupture disk 1200. The shear-scored line of weakness 1235 may form a partial circle, e.g., a "C-shape," as illustrated in FIG. 12A. Alternatively, the shear-scored line of weakness 1235 may form a complete circle following a circumference defined by the transition between the angled frustum portion 1230 and central portion 1220 of the rupture disk 1200.

Figure 12D:
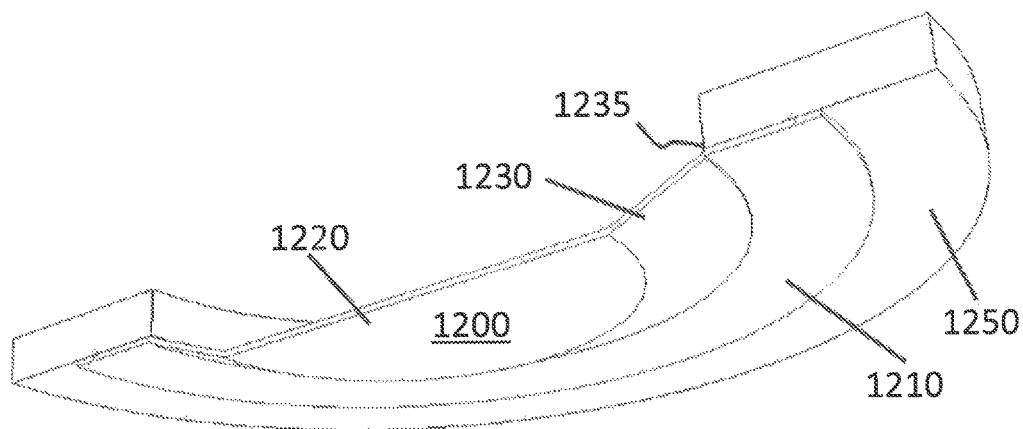
FIG. 12D is an isometric section view of an assembly including the rupture disk of FIG. 12A and an outlet member.
Figure 12E:
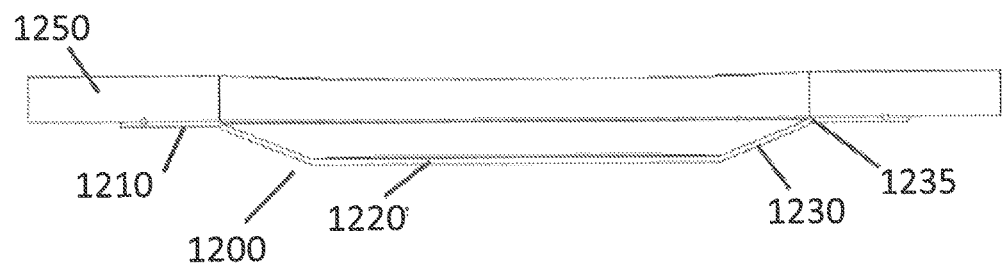
FIG. 12E is a section view of the assembly of FIG. 12D.
Figure 12F:
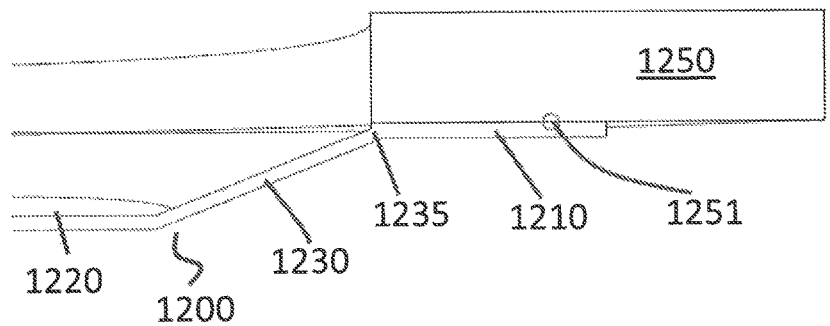
FIG. 12F is a detail section view of the assembly of FIG. 12D.

A scored frustum-shaped rupture disk may be supplied as part of an overall assembly, including one or more of an inlet component and an outlet component. For example, in one embodiment, a rupture disk 1200 may be provided with an outlet 1250 of a pressurized system, as illustrated in FIGS. 12D, 12E, and 12F. The flange 1210 of rupture disk 1200 may be welded to the outlet 1250 at weld 1251.

Figure 12G:
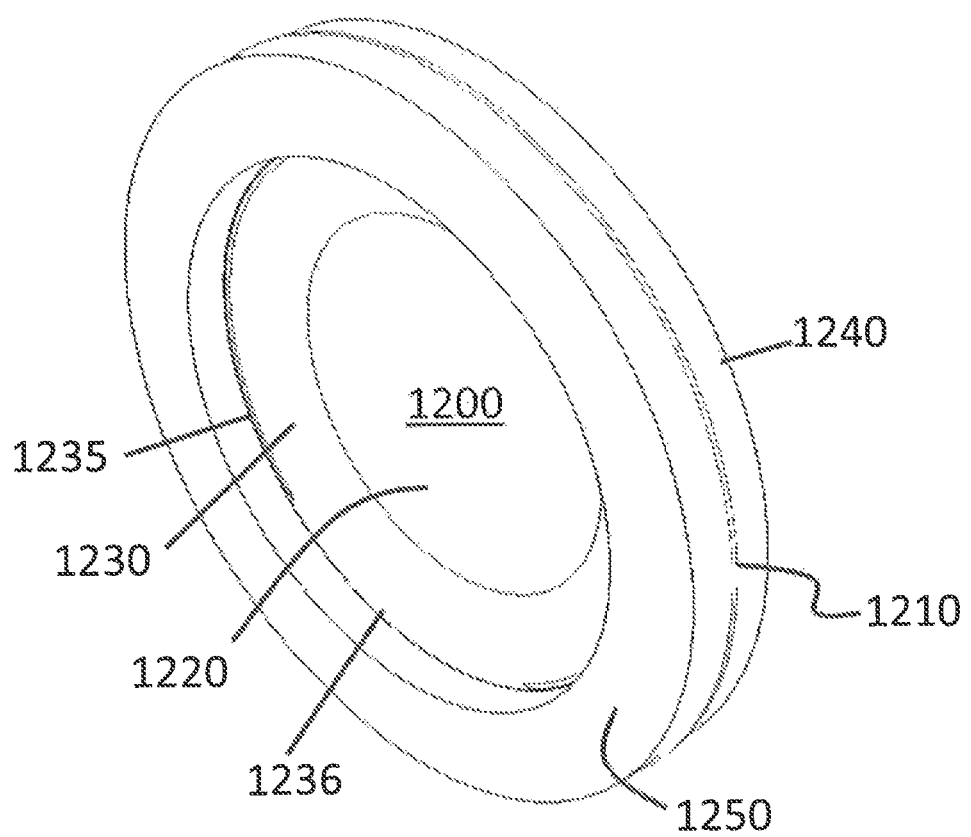
FIG. 12G is an isometric view of an assembly including the rupture disk of FIG. 12A, an outlet member, and an inlet member.
Figure 12H:
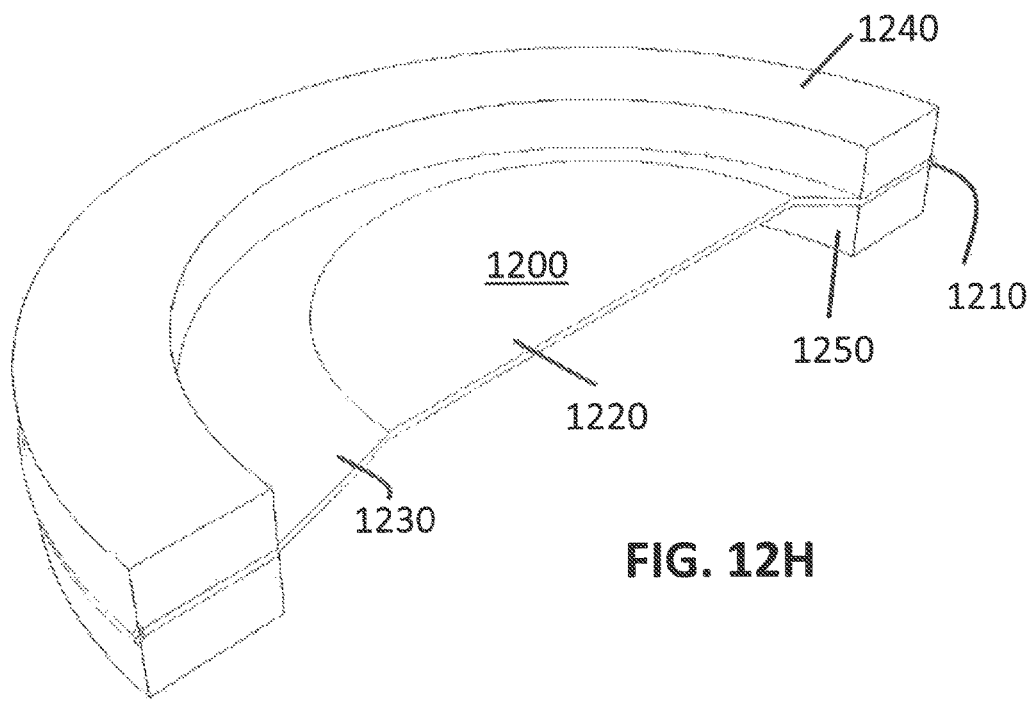
FIG. 12H is an isometric section view of the assembly of FIG. 12G.
Figure 12I:
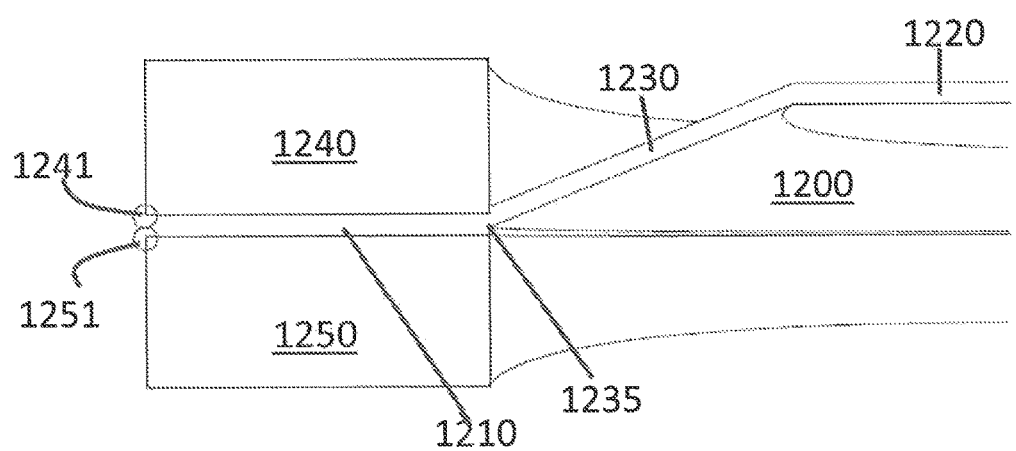
FIG. 12I is a detail section view of the assembly of FIG. 12G.

In another embodiment, a rupture disk 1200 may be bonded with an inlet 1240 and an outlet 1250 of a pressurized system, as illustrated in FIGS. 12G, 12H, and 12I. The angled frustum portion 1230 and central portion 1220 of the rupture disk 1200 may extend into the center of inlet 1240. As illustrated in FIG. 12I, the flange 1210 of rupture disk 1200 may be welded to the inlet 1240 at weld 1241 and to the outlet 1250 at weld 1251. The rupture disk 1200 may be configured to reverse and/or rupture in response to a predetermined pressure in the pressurized system. An outlet 1250 may be provided with a cutting member configured to cut the rupture disk 1200 upon reversal. Additionally or alternatively, an outlet 1250 may be provided with a catcher bar or hinge member designed to catch a ruptured portion or petal of the rupture disk 1200 after rupture.

The outlet 1250 may be provided with a stress-concentration point (also known as a stress riser) to contact the rupture disk upon reversal. The stress-concentration point may concentrate stresses where it contacts the reversed rupture disk, thereby initiating rupture and/or tearing along the line of weakness 1235. Additionally or alternatively, the outlet 1250 may be provided with a cutting member configured to cut the rupture disk 1200 upon reversal. Further, an outlet 1250 may be provided with a catcher bar or hinge member designed to catch a ruptured portion (or "petal") of the rupture disk 1200 after rupture. A stress concentration point, cutting member, catcher bar, or hinge member may be provided as part of the outlet 1250 or as an additional component used in conjunction with the outlet 1250.

Although a weld 1241, 1251 is illustrated, a rupture disk 1200 may be attached to inlet 1240 and/or outlet 1250 by any suitable mechanism, such as an adhesive, or by soldering. A rupture disk also may be crimped or clamped between an inlet and outlet. In one embodiment, a screw-thread compression may be used to clamp a rupture disk between an inlet and an outlet. For example, an inlet member and an outlet member may be configured to screw together with a rupture disk between them.

Figure 12J:
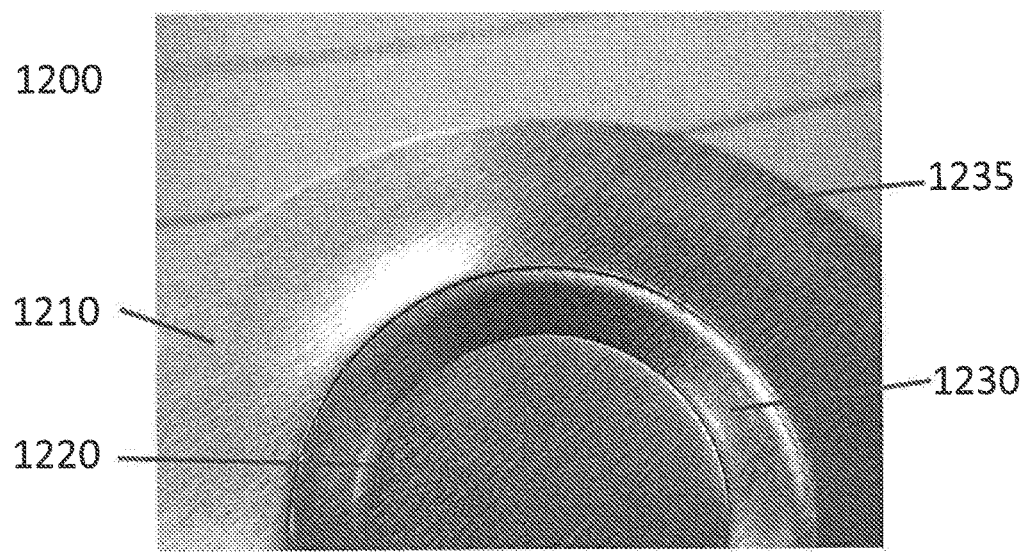
FIG. 12J is another view of a rupture disk having a shear-scored line of weakness in the transition between an angled-frustum portion and a flange portion.

FIG. 12J illustrates another view of a rupture disk 1200 having a flange portion 1210, central portion 1220, and an angled frustum portion 1230. A shear-scored line of weakness 1235 is provided at the transition between the flange portion 1210 and angled frustum portion 1230.

Figure 12K:
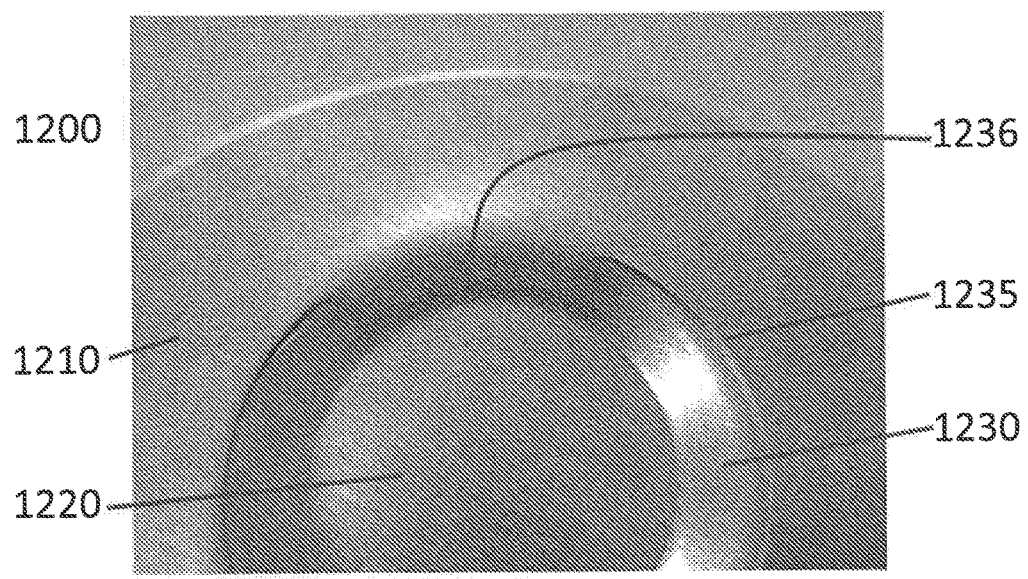
FIG. 12K is yet another view of a rupture disk having a shear-scored line of weakness in the transition between an angled-frustum portion and a flange portion.

FIG. 12K illustrates still another view of a rupture disk 1200 having a flange portion 1210, central portion 1220, and an angled frustum portion 1230. A shear-scored line of weakness 1235 is provided at the transition between the flange portion 1210 and angled frustum portion 1230. The line of weakness 1235 forms less than a complete circle, leaving an unscored portion 1236 that may act as a hinge to retain a the ruptured portion (petal) when the line of weakness 1235 tears.

Figure 12L:
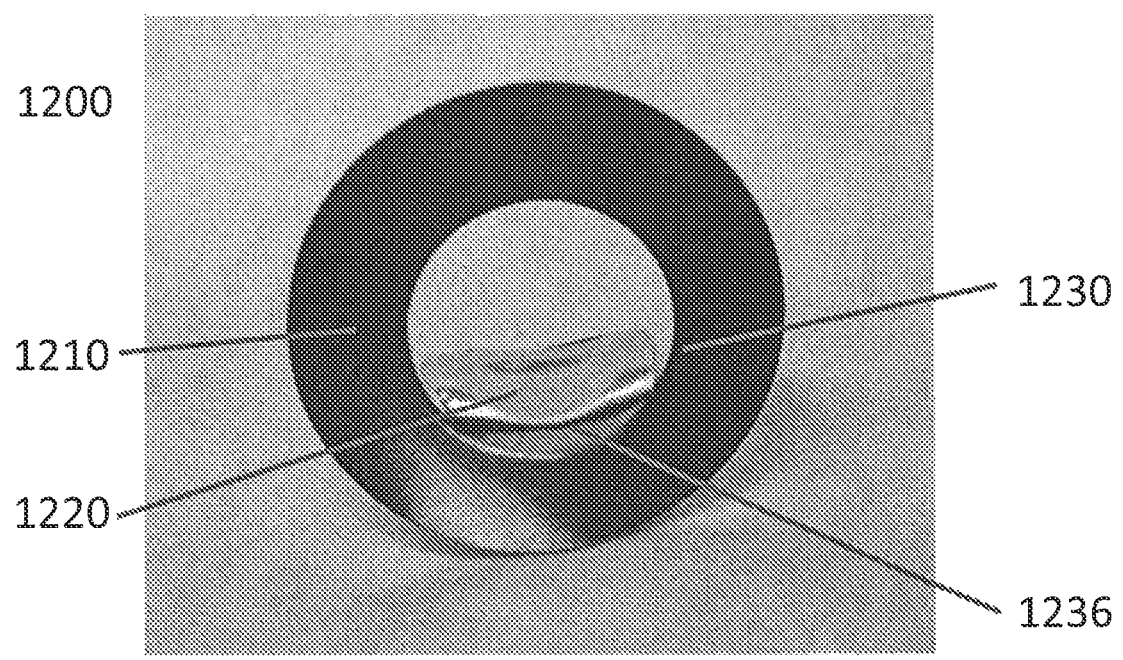
FIG. 12L is a view of a rupture disk after activation.

FIG. 12L illustrates a view of a rupture disk 1200 after activation. As illustrated, a central portion 1220 has partially torn away from the angled frustum portion 1230 and flange portion 1210, forming a petal retained by hinge 1236.

Figure 13A:
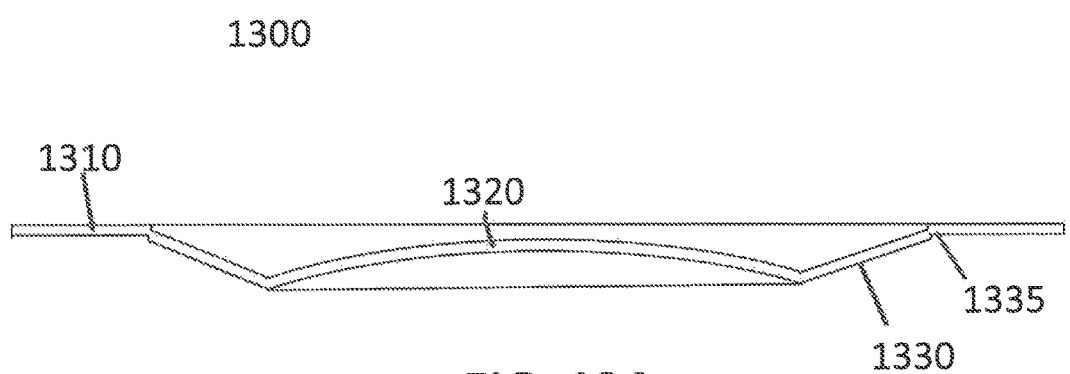
FIG. 13A is a section view of a frustum-shaped rupture disk having an inverted spherical central portion and a shear-scored line of weakness in a transition between a flange portion and an angled frustum portion.
Figure 13B:
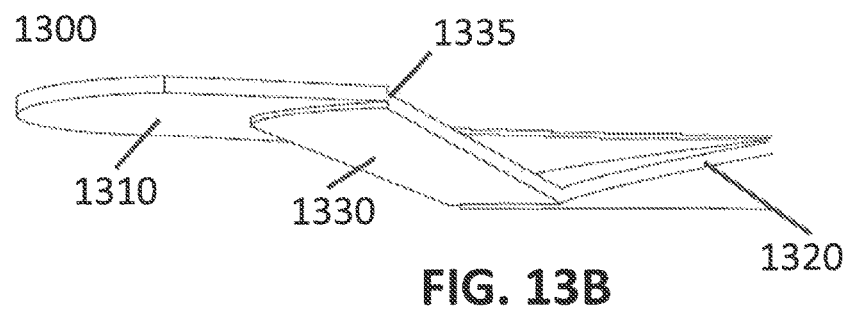
FIG. 13B is a detail isometric section view of the rupture disk of FIG. 13A.

Although a rupture disk having a shear-scored line of weakness at or near a transition between the flat flange portion and the angled frustum portion has been described as having a flat central portion (e.g., FIGS. 12A-12I), the disclosure is not limited to that particular shape. For example, as illustrated in FIG. 13A, a frustum-shaped rupture disk 1300 may have an inverted-dome-shaped central portion 1320. Other shapes for a central portion are also contemplated, including, for example, a dome shape, cone shape, and an offset dome shape. A line of weakness 1335 may be provided at or near the transition between the flat flange portion 1310 and angled frustum portion 1330 of the rupture disk 1300. The line of weakness may be a shear-scored line of weakness, or a traditional line of weakness formed by material removal.

Figure 14A:
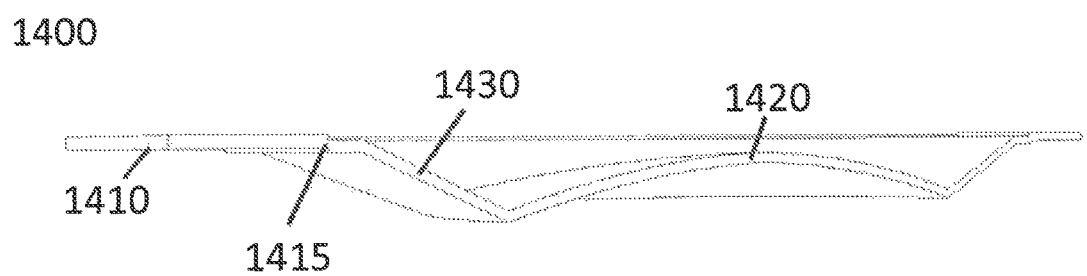
FIG. 14A is a section view of a frustum-shaped rupture disk having a shear-scored line of weakness in the flange portion.
Figure 14B:
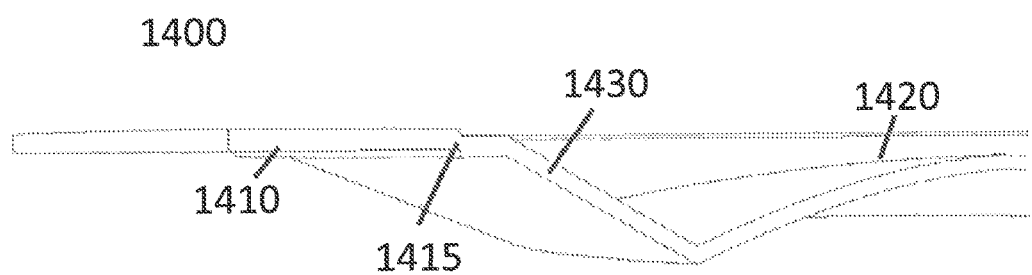
FIG. 14B is another view of the frustum-shaped rupture disk illustrated in FIG. 14B.

FIGS. 14A and 14B illustrate a frustum-shaped rupture disk 1400 having a concave/convex shaped structure including an exterior flange portion 1410 and a flat central portion 1420. An angled frustum portion 1430 between the flange 1410 and central portion 1420 provides a truncated-cone shape. A line of weakness 1415 is provided on the flange portion 1410 of the rupture disk 1400. As illustrated in FIG. 14A, the line of weakness 1415 is located close to the area of transition between the flange portion 1410 and the angled frustum portion 1430. The line of weakness 1415 may form a partial circle, e.g., a "C-shape," leaving an unweakened hinge area. Alternatively, the shear-scored line of weakness 1415 may form a complete circle around the flange portion 1410. As illustrated, the line of weakness 1415 is a shear-scored line of weakness. In another embodiment, a traditional line of weakness (e.g., one formed by material removal) may be used. By providing a line of weakness on the flange portion 1410, a larger score diameter may be used (as compared to, e.g., a line of weakness on the angled frustum portion), creating a larger opening (i.e., larger petal) when the rupture disk activates. A larger opening, in turn, may allow for quicker venting of an over-pressure condition.

Figure 15A:
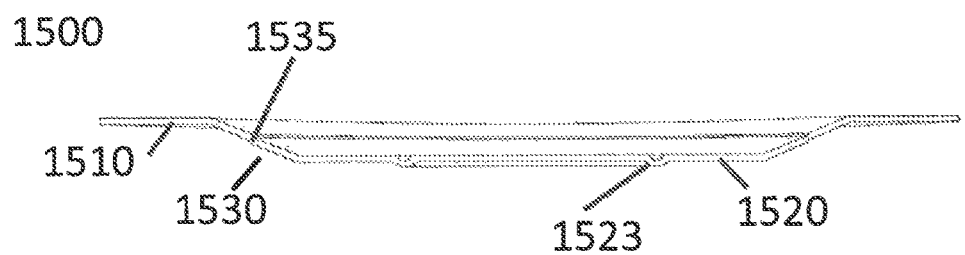
FIG. 15A is a section view of a frustum-shaped rupture disk having a stiffening member in a central portion.
Figure 15B:
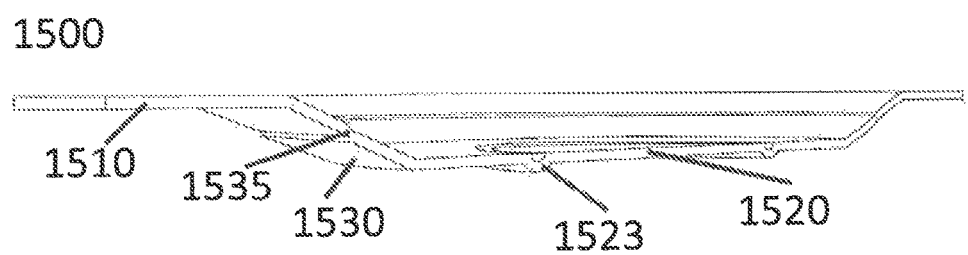
FIG. 15B is an isometric section view of the rupture disk of FIG. 15A.
Figure 15C:
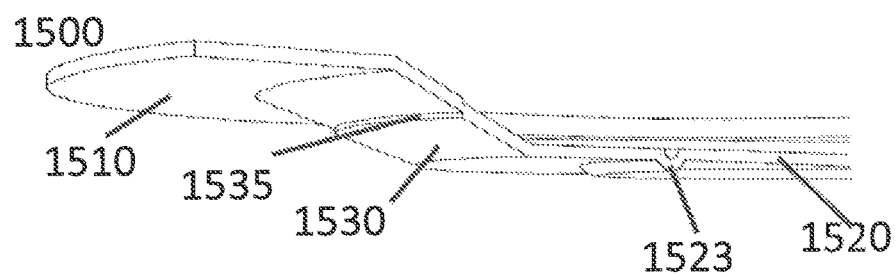
FIG. 15C is a detail isometric section view of the rupture disk of FIG. 15A.

In one embodiment, the central truncated portion of a frustum-shaped rupture disk may include one or more stiffening or support members. As illustrated in FIGS. 15A-15C, a stiffening structure 1523 may be formed within the central truncated portion 1520 of a frustum-shaped rupture disk 1500. A shear-scored line of weakness 1535 is illustrated in an angled frustum portion 1530 of the rupture disk 1500. In another embodiment, a line of weakness may be formed by traditional methods of material removal and/or may be placed in another portion of the rupture disk. As illustrated in FIGS. 15A-15C, the stiffening structure 1523 is a generally circular stiffening rib. A stiffening member, such as illustrated in FIGS. 15A, 15B, and 15C may strengthen the central portion of a frustum-shaped rupture disk, and may improve the ability of a rupture disk to withstand damage from vibration, vacuum pressure, and cyclical pressure loading. The rupture disk 1500 may be installed with a pressurized system, or a component of a pressurized system, via flange portion 1510.

Figure 16A:
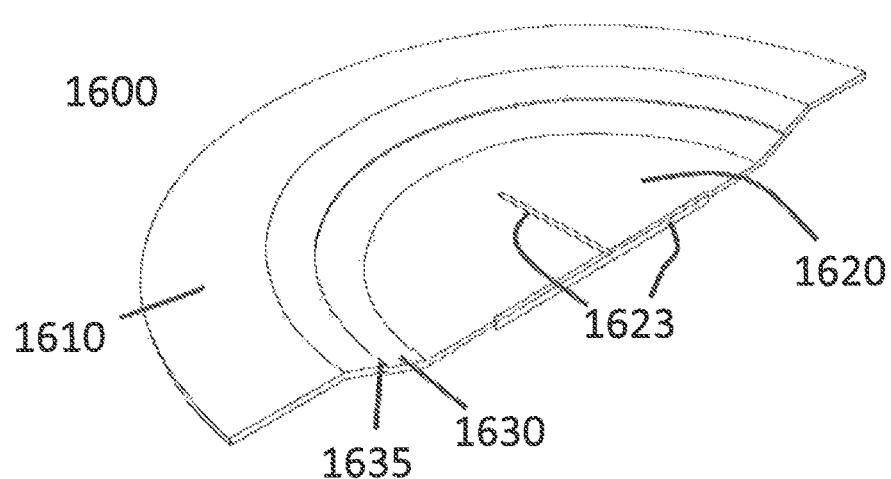
FIG. 16A is an isometric section view of another frustum-shaped rupture disk having a stiffening member in a central portion.
Figure 16B:
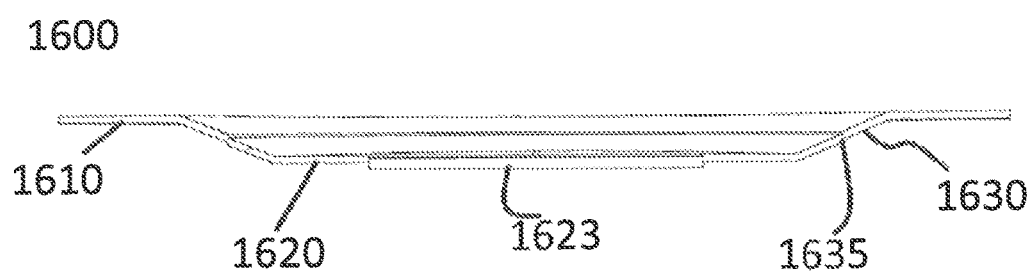
FIG. 16B is a section view of the rupture disk of FIG. 16A.

Another embodiment of a frustum-shaped rupture disk with a stiffening member is illustrated in FIGS. 16A and 16B. The stiffening member 1623 is positioned on the central portion 1620 of the rupture disk 1600. A shear-scored line of weakness 1635 is illustrated in an angled frustum portion 1630 of the rupture disk 1600. In another embodiment, a line of weakness may be formed by traditional methods of material removal and/or may be placed in another portion of the rupture disk. As illustrated in FIGS. 16A and 16B, a stiffening member 1623 may be cross-shaped, formed from two intersecting stiffening members. Additionally or alternatively, a stiffening member may be formed from more than two or less than two intersecting stiffening members. The rupture disk 1600 may be installed with a pressurized system, or a component of a pressurized system, via flange portion 1610.

Although a stiffening member is illustrated as being circular or cross-shaped, the disclosure is not limited to those shapes of stiffening members. For example, a stiffening member may take the shape of a single straight line, multiple intersecting or non-intersecting lines, a square, an oval, a star, or any other suitable geometry to provide stiffness to a portion of the rupture disk.

Figure 17A:
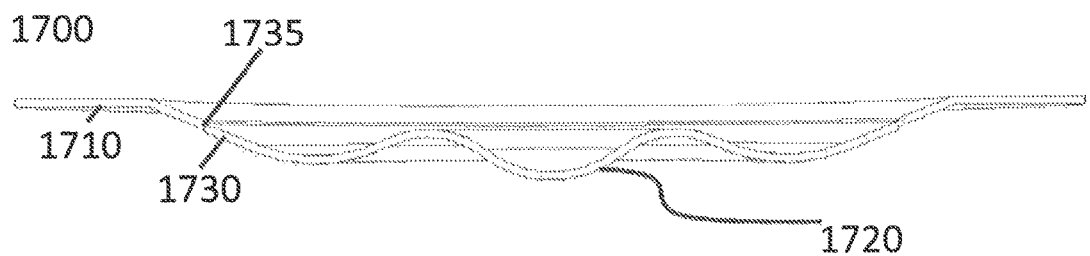
FIG. 17A is a section view of another frustum-shaped rupture disk having a stiffening member in a central portion.
Figure 17B:
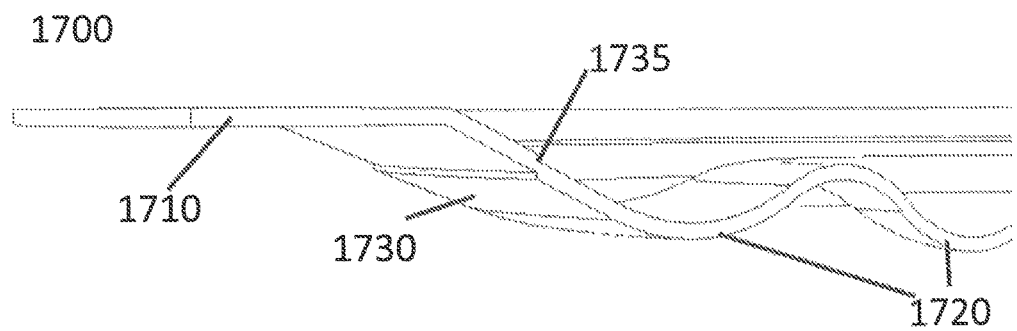
FIG. 17B is a detail isometric section view of the rupture disk of FIG. 17A.

In another embodiment, illustrated in FIGS. 17A and 17B, a central portion 1720 of a rupture disk 1700 may be shaped to provide stiffness without using a stiffening member. As shown, the central portion 1720 may have a waved or rippled geometry to provide or enhance stiffness. A shear-scored line of weakness 1735 is illustrated in an angled frustum portion 1730 of the rupture disk 1700. In another embodiment, a line of weakness may be formed by traditional methods of material removal and/or may be placed in another portion of the rupture disk. The rupture disk 1700 may be installed with a pressurized system, or a component of a pressurized system, via flange portion 1710.

Figure 18:
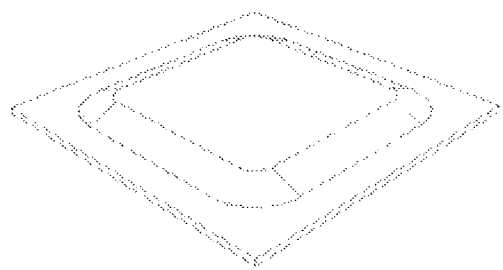
FIG. 18 is an isometric view of a square frustum-shaped disk.
Figure 19:
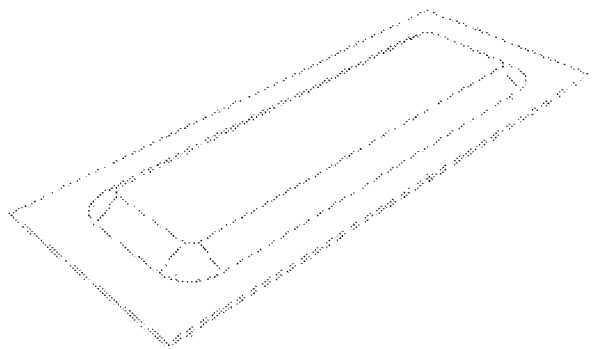
FIG. 19 is an isometric view of a rectangular frustum-shaped disk.
Figure 20:
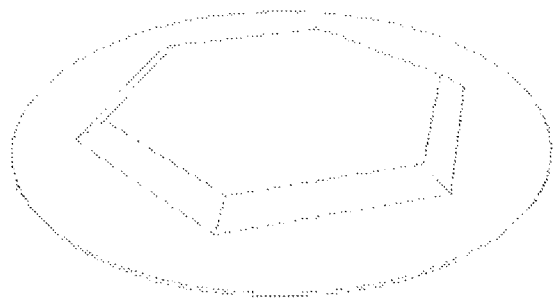
FIG. 20 is an isometric view of a multifaceted frustum-shaped disk.
Figure 21:
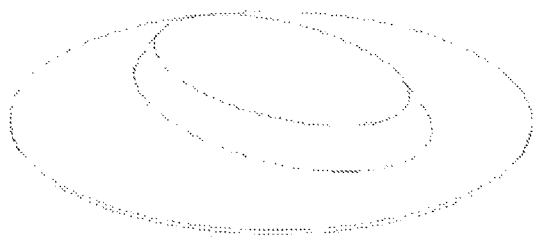
FIG. 21 is an isometric view of an ovoid frustum-shaped disk.

While a rupture disk has been illustrated as having a circular shape, other shapes for a rupture disk and/or a frustum portion of a rupture disk are contemplated, including, for example: square (FIG. 18), rectangular (FIG. 19), multi-faceted geometric (FIG. 20), and ovoid (FIG. 21) shapes. In one embodiment, a rupture disk may take a rectangular shape when used with a rectangular battery. Likewise, while rupture disk has been illustrated as having a C-shaped line of weakness, a line of weakness is not limited to that particular shape. A line of weakness may form complete circle, creating an O-shaped line of weakness. A line of weakness also may be rectangular or semi-rectangular, particularly when used with a rectangular-shaped rupture disk or a rupture disk having a rectangular-shaped frustum. It is further contemplated that a plurality of lines of weakness may be combined in a single frustum-shaped rupture disk.

In addition to the frustum-shaped rupture disks described above, principles of the disclosure may also be used in other types or shapes of rupture disks. For example, the rupturable portion of a rupture disk may take the form of a (non-truncated) cone. In such a rupture disk, a line of weakness may be provided in a conical portion of the rupture disk, in a flange portion of the rupture disk, or in a transition between the conical and flange portions. As another example, the rupturable portion a rupture disk may take the form of a truncated dome. In such a rupture disk, a line of weakness may be provided in the dome portion of the rupture disk, in a flange portion of the rupture disk, in a truncated central portion of the rupture disk, or in a transition between two portions of the rupture disk.

Although reverse-buckling rupture disks are disclosed above, principles of the disclosure may also be used with a forward-acting rupture disk (i.e., a rupture disk loaded in tension). For example, a line of weakness (e.g., a shear score) may be used to provide control of burst pressure and/or the shape of the opening when a forward-acting rupture disk opens.

A disclosed frustum-shaped rupture disk may be used in any number of suitable applications. In one embodiment, a disclosed frustum-shaped rupture disk may be used with a battery cell. For example, the disk may be joined to a battery cell top cover or into a battery cell can and exposed to a pressurized condition within the battery cell. A battery cell top cover or cell can may be a stamped or deep-drawn component, and it is contemplated that the disclosed rupture disk may be used with other stamped or deep-drawn components as well. In another embodiment, the disk may be attached to at least one machined part (e.g., an outlet or an inlet of a pressurized system, or a component configured to be installed with a pressurized system). In still another embodiment, the disclosed disk may be crimped between two crimping components of a rupture disk assembly, which can then be installed with a pressurized system. For example, a known rupture disk is used in a crimped assembly as part of the commercially available AC-1 Sta-Kul sealed-type safety head assembly manufactured and sold by BS&B Safety Systems. In still another embodiment, a disclosed rupture disk may be retained in a mounting assembly or installed with a pressurized system by way of screw-thread compression.

A disclosed frustum-shaped rupture disk may be an integrally formed part of a device, and not simply an added component. For example, a frustum-shaped rupture disk may be formed into the lid of a battery housing or into a wall or face of a pressurized vessel. Integrally forming a rupture disk into a part of a device may increase efficiency by reducing or eliminating the processes required to bond the rupture disk to the device.

Other embodiments will be apparent to those skilled in the art from consideration of the specification and practice of the disclosure herein. It is intended that the specification and examples be considered as exemplary only, with a true scope and spirit of the disclosure being indicated by the following claims.

What is claimed is:

1. A frustum-shaped rupture disk, comprising:
a flange portion;
a central truncated portion, wherein the central truncated portion forms a dome;
wherein the central truncated portion defines a center, and wherein the dome is offset from the center of the central truncated portion;
an angled frustum portion; and
a transition between the central truncated portion and the angled frustum portion; wherein the angled frustum portion extends inwardly from the flange portion to the transition;
wherein the angled frustum portion includes a line of weakness configured to open when the rupture disk responds to a predetermined pressure.

2. The frustum-shaped rupture disk of claim 1, further comprising:
an inlet for a pressurized system;
wherein the flange portion is attached to the inlet.

3. The frustum-shaped rupture disk of claim 1, further comprising:
an outlet for a pressurized system;
wherein the flange portion is attached to the outlet.

4. The frustum-shaped rupture disk of claim 1, further comprising:
an inlet for a pressurized system; and an outlet for a pressurized system;
wherein the flange portion is sealed between the inlet and the outlet.

5. The frustum-shaped rupture disk of claim 1, wherein the line of weakness is a shear-scored line of weakness.

6. The frustum-shaped rupture disk of claim 1, wherein: the central truncated portion has a stiffening member.

7. The frustum-shaped rupture disk of claim 6, wherein the stiffening member is a circular rib structure.

8. The frustum-shaped rupture disk of claim 6, wherein the stiffening member is a cross-shaped rib structure.

9. The frustum-shaped rupture disk of claim 1,
wherein the central portion includes at least one wave configured to stiffen the central truncated portion.

10. A frustum-shaped rupture disk, comprising:
a flange portion;
a central truncated portion, wherein the central truncated portion forms a cone;
an angled frustum portion; and
a transition between the central truncated portion and the angled frustum portion;
wherein the angled frustum portion extends inwardly from the flange portion to the transition, wherein the angled frustum portion includes a line of weakness configured to open when the rupture disk responds to a predetermined pressure.

11. The frustum-shaped rupture disk of claim 10, further comprising:
an inlet for a pressurized system;
wherein the flange portion is attached to the inlet.

12. The frustum-shaped rupture disk of claim 10, further comprising:
an outlet for a pressurized system;
wherein the flange portion is attached to the outlet.

13. The frustum-shaped rupture disk of claim 10, further comprising:
an inlet for a pressurized system; and
an outlet for a pressurized system;
wherein the flange portion is sealed between the inlet and the outlet.

14. The frustum-shaped rupture disk of claim 10, wherein the line of weakness is a shear-scored line of weakness.

15. The frustum-shaped rupture disk of claim 10, wherein: the central truncated portion has a stiffening member.

16. The frustum-shaped rupture disk of claim 15, wherein the stiffening member is a circular rib structure.

17. The frustum-shaped rupture disk of claim 15, wherein the stiffening member is a cross-shaped rib structure.

18. The frustum-shaped rupture disk of claim 10,
wherein the central portion includes at least one wave configured to stiffen the central truncated portion.

19. A frustum-shaped rupture disk, comprising:
a flange portion;
a central truncated portion;
a stiffening member configured to provide stiffness to the central truncated portion;
an angled frustum portion; and
a transition between the central truncated portion and the angled frustum portion;
wherein the angled frustum portion extends inwardly from the flange portion to the transition, wherein the angled frustum portion includes a line of weakness configured to open when the rupture disk responds to a predetermined pressure.

20. The frustum-shaped rupture disk of claim 19, further comprising:
an inlet for a pressurized system;
wherein the flange portion is attached to the inlet.

21. The frustum-shaped rupture disk of claim 19, further comprising:
an outlet for a pressurized system;
wherein the flange portion is attached to the outlet.

22. The frustum-shaped rupture disk of claim 19, further comprising:
an inlet for a pressurized system; and
an outlet for a pressurized system;
wherein the flange portion is sealed between the inlet and the outlet.

23. The frustum-shaped rupture disk of claim 19, wherein the line of weakness is a shear-scored line of weakness.

24. The frustum-shaped rupture disk of claim 19, wherein the stiffening member is a circular rib structure.

25. The frustum-shaped rupture disk of claim 19, wherein the stiffening member is a cross-shaped rib structure.

26. The frustum-shaped rupture disk of claim 19,
wherein the stiffening member comprises at least one wave.

* * * * *